(12) United States Patent
Bybell et al.

(10) Patent No.: US 7,905,409 B2
(45) Date of Patent: Mar. 15, 2011

(54) PRINT MEDIUM FEATURE ENCODING AND DECODING

(75) Inventors: Daniel P. Bybell, Medford, MA (US); Willilam T. Vetterling, Lexington, MA (US)

(73) Assignee: Senshin Capital, LLC, Wilmington, DE (US)

( * ) Notice: Subject to any disclaimer, the term of this patent is extended or adjusted under 35 U.S.C. 154(b) by 1124 days.

(21) Appl. No.: 11/133,920

(22) Filed: May 20, 2005

(65) Prior Publication Data

US 2006/0261168 A1 Nov. 23, 2006

(51) Int. Cl.
*G06K 7/10* (2006.01)

(52) U.S. Cl. ..................................... 235/462.01

(58) Field of Classification Search . 235/462.01–462.49
See application file for complete search history.

(56) References Cited

U.S. PATENT DOCUMENTS

| | | | |
|---|---|---|---|
| 3,599,153 A | 8/1971 | Lewis et al. | |
| 4,039,258 A | 8/1977 | Hujer et al. | 355/27 |
| 4,349,272 A | 9/1982 | Holthusen | 355/69 |
| 4,353,641 A | 10/1982 | Merlo et al. | 355/38 |
| 4,387,297 A | 6/1983 | Swartz et al. | |
| 4,463,251 A | 7/1984 | Koutonen et al. | 235/470 |
| 4,496,955 A | 1/1985 | Maeyama et al. | 346/76 |
| 4,535,204 A | 8/1985 | Hughes et al. | 379/357.04 |
| 4,573,059 A | 2/1986 | Shinma et al. | 346/76 |
| 4,590,490 A | 5/1986 | Takanashi et al. | 346/76 |
| 4,623,231 A | 11/1986 | Saito et al. | 354/21 |
| 4,710,781 A | 12/1987 | Stephenson | 346/76 |
| 4,736,215 A | 4/1988 | Hudspeth et al. | 354/21 |
| 4,760,248 A | 7/1988 | Swartz et al. | |
| 4,855,769 A | 8/1989 | Slavitter et al. | 354/21 |
| 4,860,037 A | 8/1989 | Harvey | 354/21 |
| 4,951,086 A | 8/1990 | Hicks | 355/41 |
| 4,965,628 A | 10/1990 | Olliver | 355/41 |
| 5,067,114 A | 11/1991 | Rorden | 367/81 |
| 5,068,520 A | 11/1991 | Sato | |
| 5,130,745 A | 7/1992 | Cloutier et al. | 355/40 |
| 5,207,412 A | 5/1993 | Coons, Jr. et al. | 270/1.1 |
| 5,278,400 A | 1/1994 | Appel | 358/3.28 |
| 5,317,364 A | 5/1994 | Fields | 355/40 |
| 5,329,107 A | 7/1994 | Priddy et al. | 235/494 |
| 5,333,210 A | 7/1994 | Spirkovska et al. | 382/156 |
| 5,366,252 A | 11/1994 | Nishida et al. | |
| 5,479,515 A | 12/1995 | Longacre, Jr. | 380/54 |
| 5,488,223 A * | 1/1996 | Austin et al. | 235/375 |

(Continued)

FOREIGN PATENT DOCUMENTS

EP 0758081 A3 1/1997

(Continued)

OTHER PUBLICATIONS

*The Bar Code FAQ version 4*, Azalea Software, Inc., Copyright 1999, pp. 1-5.

(Continued)

*Primary Examiner* — Jamara A Franklin
(74) *Attorney, Agent, or Firm* — Woodcock Washburn LLP

(57) ABSTRACT

Techniques are disclosed for encoding and decoding codes, such as bar codes, containing a plurality of features, such as bars and spaces of varying widths. In one aspect of the present invention, techniques are provided for encoding information in an arbitrary-length code using a single symbol. Techniques for encoding and decoding information using codes having features with more than two distinct values are also provided.

19 Claims, 20 Drawing Sheets

U.S. PATENT DOCUMENTS

| | | | |
|---|---|---|---|
| 5,552,591 A | 9/1996 | Bossen et al. | 235/462 |
| 5,557,092 A | 9/1996 | Ackley et al. | 235/462 |
| 5,710,420 A | 1/1998 | Martin et al. | 235/487 |
| 5,757,001 A | 5/1998 | Burns | |
| 5,760,384 A | 6/1998 | Itoh et al. | |
| 5,811,781 A | 9/1998 | Ackley | 235/462 |
| 5,852,745 A | 12/1998 | Fontal et al. | 395/835 |
| 5,911,921 A | 6/1999 | Takai et al. | |
| 5,931,960 A | 8/1999 | Kletter et al. | 714/704 |
| 5,939,700 A | 8/1999 | Ackley | 235/462.01 |
| 5,959,296 A | 9/1999 | Cyr et al. | |
| 5,984,193 A | 11/1999 | Uhling | 235/494 |
| 6,012,638 A * | 1/2000 | Ackley et al. | 235/462.01 |
| 6,047,110 A | 4/2000 | Smith | 395/111 |
| 6,135,658 A | 10/2000 | Reele et al. | 400/240.3 |
| 6,186,406 B1 | 2/2001 | Ackley | 235/494 |
| 6,273,340 B1 | 8/2001 | Rivailler | 235/494 |
| 6,344,891 B1 | 2/2002 | Imai | 355/40 |
| 6,353,479 B1 | 3/2002 | Lubawy et al. | 358/1.13 |
| 6,585,157 B2 | 7/2003 | Brandt et al. | 235/462.07 |
| 6,585,341 B1 | 7/2003 | Walker et al. | 347/14 |
| 6,595,427 B1 | 7/2003 | Soni | |
| 6,646,754 B1 | 11/2003 | Redd et al. | 358/1.13 |
| 6,650,397 B2 | 11/2003 | Lucey et al. | 355/40 |
| 6,674,923 B1 | 1/2004 | Shih et al. | 382/305 |
| 6,688,522 B1 | 2/2004 | Philyaw | 235/462.01 |
| 6,712,446 B1 | 3/2004 | Huffman | 347/19 |
| 6,729,543 B1 * | 5/2004 | Arons et al. | 235/462.13 |
| 6,786,416 B2 | 9/2004 | Soni | |
| 6,793,310 B2 | 9/2004 | Darby et al. | 347/16 |
| 6,994,257 B2 | 2/2006 | Soni | |
| 2003/0189610 A1 | 10/2003 | Darby | |
| 2003/0207023 A1 | 11/2003 | Soni | |

FOREIGN PATENT DOCUMENTS

| | | |
|---|---|---|
| EP | 1 160 720 | 12/2001 |
| JP | 04 251396 A | 9/2004 |
| WO | WO 98/50882 | 11/1998 |
| WO | WO 9850882 A3 | 11/1998 |

OTHER PUBLICATIONS

*Barcoding for Beginners & Bar Code FAQ*, ID Automation.com, pp. 1-8.

U.S. Appl. No. 12/027,770, filed Feb. 7, 2008, Soni.

Feldhoff, et al., "Field Test of Post Consumer Package Identification by Near Infrared Spectroscopy Combined With Neural Networks; 1996," Proceedings of the 7.sup.th International Conference on Near Infrared Spectroscopy Aug. 6-11, 1995; pp. 389-39.

PCT Application No. PCT/US98/09161: International Search Report, dated Feb. 8, 1999.

* cited by examiner

PRINT MEDIUM FEATURE ENCODING AND DECODING

CROSS REFERENCE TO RELATED APPLICATIONS

This application is related to commonly owned U.S. Pat. No. 6,801,233 B2, granted on Oct. 5, 2004, entitled "Thermal Imaging System," which is hereby incorporated by reference.

BACKGROUND

1. Field of the Invention

The present invention relates to printed codes and, more particularly, to codes for use on print media to identify properties of such media.

2. Related Art

Conventional digital printers print on print media having a wide variety of properties. Examples of properties which may vary among different print media include dimensions, manufacturer, chemical composition, and sensitivity. Often it is useful for the printer to take into account the particular properties of the current print medium when printing, so that the printer may optimize the quality of the print output based on such properties.

Although the user of the printer may manually inform the printer of the current print medium properties (such as by selecting settings on a hardware control panel or through a software configuration program), various techniques are well-known for encoding information descriptive of such properties on the print medium itself. For example, such information (referred to herein as "print medium property information") may be encoded in a code printed on the medium, in magnetic material incorporated into the medium, or in a chemical substrate on the medium. In such systems the printer is equipped with a device that reads the encoded information from the print medium. The printer decodes the information to identify the properties of the print medium. The printer may then take appropriate steps to optimize the print output based on the identified properties of the print medium.

For example, in some systems the print medium property information is encoded in a bar code that is printed on the medium. The corresponding printer includes a bar code reader that reads the bar code from the print medium as the bar code passes underneath the reader.

Before describing such conventional systems further, conventional bar codes will be explained in more detail. In general, a bar code is an arrangement of dark bars and spaces that is used to encode information. Such information typically relates to a particular product, and typically is printed on the product or the product's packaging. Many different systems exist for encoding information in bar codes. The term "bar code system" refers herein to any particular system for representing information using bar codes. The Universal Product Code (UPC), which is printed nearly-universally on product packaging, is perhaps the best-known example of a bar code system.

Referring to FIG. 1, a generic example of a conventional bar code 100 is shown. The bar code 100 includes a sequence of vertical black bars ("bars") 102a-i of various widths separated by white spaces ("spaces") 104a-h of various widths. The term "feature" refers herein to either a single bar or a single space in a bar code. Therefore, each of the bars 102a-i and each of the spaces 104a-h is a feature.

Each feature in a bar code typically is significantly taller than it is wide. The term "feature width" refers herein to the width of a single feature in the dimension 106a that connects the centers of all of the features (e.g., bars). Typically, a bar code system imposes a minimum feature width (such as 7.5 mils) on all features in bar codes in the system. The minimum feature width is referred to herein as a "unit." Different features in a single bar code may have different widths. For example, feature 102e is twice as wide as feature 102d. If the width of feature 102d is the minimum feature width, then feature 102d may be said to be a "single width" or "narrow" feature, while feature 102e may be said to be a "double width" or "wide" feature.

Many bar code systems require the width of each feature to be an integral multiple of the minimum feature width. For example, in the example bar code 100 illustrated in FIG. 1, the width of each feature is either equal to the minimum feature width or exactly twice the minimum feature width. Not all systems, however, require all feature widths to be integral multiples of the minimum feature (unit) width. In bar codes with only two distinct widths, wide features typically are between 2 and 2.5 times as wide as narrow features. In general, feature widths within a single bar code may vary in any way so long as the features can be consistently decoded correctly.

The term "combination" refers herein to a specific, unique ordering of a limited number of features using a given width distribution. The term "width distribution" will be defined below. The bar code 100 illustrated in FIG. 1 is an example of a combination. The term "symbol," as used herein, is synonymous with "combination."

Typically, a bar code system defines a mapping between a set of combinations and corresponding values, such as characters and/or numbers. Such a mapping may be used to encode the values into their corresponding combinations and to decode the combinations into their corresponding values. A bar code system typically imposes a set of restrictions on symbols within the system, such as a fixed symbol length (measured in units), a fixed number of features, or both. The "symbol set" of a bar code system refers to all symbols defined in the bar code system. Typically the symbol set includes all possible symbols that satisfy the applicable set of restrictions, such as symbol length.

The term "bar code" typically refers to a sequence of one or more symbols that are members of the same symbol set (i.e., that are defined according to a single bar code system). The term "start code" refers to a special sequence of features that is not a member of the symbol set, and that defines the start of a bar code. The start code that occurs at the beginning of a particular bar code sequence identifies the bar code system and any special coding features that the bar code may contain. Similarly, the term "stop code" refers to a special sequence of features that is not a member of the symbol set, and that defines the end of a bar code. A conventional bar code, therefore, typically includes a start code, followed by one or more symbols, followed by a stop code. The start code and stop code enable the bar code decoder to scan the bar code in the correct direction and use the correct decoding method.

As described above, a bar code symbol includes a sequence of features that may differ from each other in width. In some bar code systems, however, each symbol is restricted to include a fixed number of features having a fixed number of predefined widths. For example, a bar code system may require each symbol to include four features of a single width, three features of double width, and one feature of triple width, for a total of eight features having a total width of thirteen units. This "width distribution" may be expressed using the notation (4,3,1). In such systems, all symbols have the same width distribution but vary by the order in which features of different widths appear.

A "width array" is an array which represents the sequence of feature widths in a particular bar code symbol. For example, when using the width distribution just noted, an example of a valid width array is (1,2,1,1,3,2,2,1). This width array represents a symbol in which the first feature is single-width, the second feature is double-width, the third feature is single-width, the fourth feature is single-width, and so on. As used herein, the variable N refers to the number of features in a symbol, and the variable $W_f$ refers to the width of the feature at index f in the symbol, where $1 \leq f \leq N$. In the case of the example width array just provided, $W_1=1$, $W_2=2$, and $W_5=3$.

Different bar code systems have different "information densities." The term "information density" refers herein to the effective number of bits per unit that a particular bar code system is capable of encoding, and may be defined as $\log_2$ (total number of available symbols)/(length of a symbol expressed in "units"). For example, in a "2 of 5" bar code system, each symbol has exactly five features, exactly two of which are wide and exactly three of which are narrow (i.e., the width distribution is (3,2)). An example of a 2 of 5 symbol is $B_W S_N B_N S_W B_N$, where "B" refers to a bar, "S" refers to a space, the subscript "W" refers to a wide feature, and the subscript "N" refers to a narrow feature.

There are 10 possible symbols in the 2 of 5 system, effectively representing 3.3 bits of information. There are 7 units in each symbol (3 narrow features of one unit each, plus 2 wide features of two units each). Therefore the information density of the 2 of 5 system is 3.3 bits/7 units, or approximately 0.47 bits per unit. This information density is relatively high among existing bar code systems. It is desirable to achieve higher information densities in situations in which a large amount of information must be encoded in a small bar code.

A bar code system would not be useful if it were not possible to encode information into a bar code and to decode information from a bar code. Therefore, for any particular bar code system it is necessary to provide methods for encoding and decoding information to and from bar codes. Typically, encoding is performed using a lookup table which maps unencoded information (such as numbers) into bar codes in the system. Similarly, decoding typically is performed using a lookup table that maps bar codes into numerical information or other kinds of values. Although encoding and decoding may be performed quickly using lookup tables, one disadvantage of lookup tables is that their storage may consume significant amounts of memory, particularly in bar code systems in which symbols contain a large number of features. In general, it is desirable to perform encoding and decoding both quickly and using a relatively small amount of memory.

Therefore, what is needed are improved techniques for efficiently encoding and decoding media-identifying information in bar codes.

SUMMARY

Techniques are disclosed for encoding and decoding codes, such as bar codes, containing a plurality of features, such as bars and spaces of varying widths. In one aspect of the present invention, techniques are provided for encoding information in an arbitrary-length code using a single symbol. Techniques for encoding and decoding information using codes having features with more than two distinct values are also provided.

Other features and advantages of various aspects and embodiments of the present invention will become apparent from the following description and from the claims.

DETAILED DESCRIPTION

Figure 1:
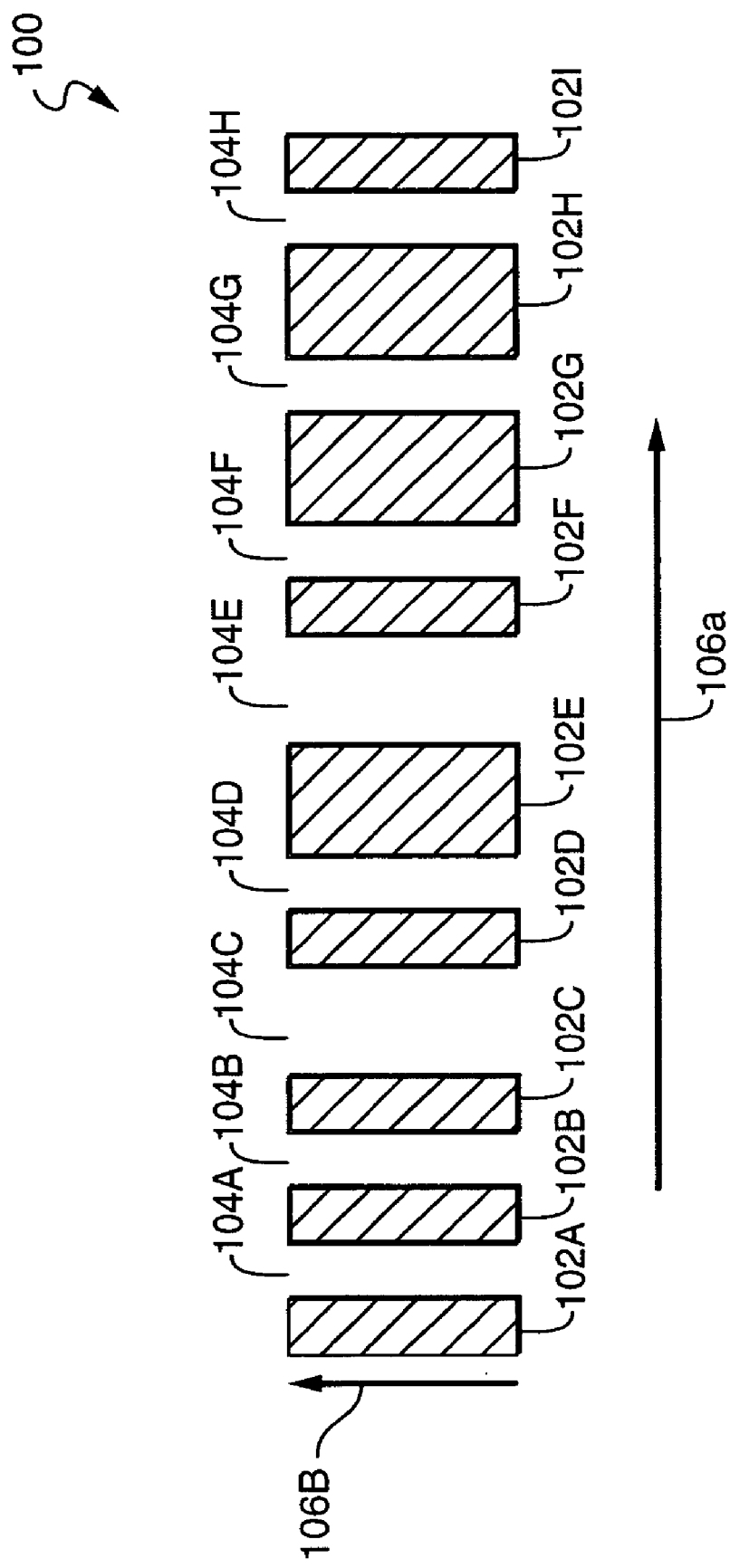
FIG. 1 illustrates a generic example of a conventional bar code.

Before describing embodiments of the present invention, certain properties of conventional bar code systems will be described. In many existing bar code systems, each symbol contains a small number of features. As a result, the number of distinct symbols typically is small, usually 200 or fewer. To obtain a larger number of combinations in such systems, it is necessary to combine symbols. For example, in a 2 of 5 bar code system, there are five features, two of which are two units wide, giving a total length of 7 units (e.g., 7 mm if the unit is 1 mm). There are 10 possible combinations of these features (i.e., ten different symbols), which are used to encode the digits 0 through 9. A bar code containing two such symbols would have a total length of 14 units (e.g., 14 mm) and be capable of encoding a total of 100 possible values. Similarly, a three-symbol 2 of 5 bar code can encode 1,000 values, and a four-symbol 2 of 5 bar code can encode 10,000 values.

According to embodiments of the present invention, however, additional information is encoded by extending the length of a single symbol rather than by combining multiple symbols. The number of combinations increases dramatically as the symbol length grows. For example, if instead of two symbols of 7 mm, we use one symbol of 14 mm with four wide bars and six narrow bars (4 of 10), then the total number of combinations is 210 (compared to 100 in the case of two symbols using 2 of 5). The three-symbol equivalent would be 6 of 15, yielding 5,005 values (compared to 1,000 in the case of 2 of 5). Using a single 28 mm symbol (8 of 20) yields 125,970 values—over 12 times that available in the 2 of 5 system.

In one embodiment of the present invention, high information densities are obtained by providing a bar code system in which every bar code consists of a single symbol, regardless of the number of features in the symbol. Additional values are obtained by extending the length of the single symbol rather than by generating multiple symbols and concatenating them. It should be appreciated that in such a system a bar code of any length need not include any internal start and stop codes. Furthermore, under certain conditions, the initial start code and the terminating stop code may be eliminated from bar codes in the system. The same techniques may be applied to code systems other than bar code systems. More generally, therefore, in one embodiment of the present invention a code system is provided in which every code consists of a single symbol, regardless of the number of features in the system. The term "feature," therefore, is not limited to bars and spaces in a bar code, but rather refers to any markings or other family of distinguishable entities which may be used to encode information in any kind of code.

A bar code consists of "a single symbol" in the following sense. A bar code may be considered to include both data and metadata. In conventional bar code systems, the data includes one or more symbols that encode information, and the metadata includes special symbols such as start codes and stop codes. In various embodiments of the present invention, bar code systems are provided in which the data portion of each bar code satisfies a set of constraints that applies to all of the features in the data portion as a whole, rather than to one or more subsets of features in the data portion (such as individual symbols). For example, in the 2 of 5 code described above, a 10-feature bar code is defined by a set of constraints that is satisfied by each of two 5-feature subsets of the bar code. Bar codes having additional features in the 2 of 5 system are generated by generating additional symbols, each of which satisfies the 2 of 5 constraints, and appending the symbols to the bar code. In embodiments of the present invention, in contrast, the set of constraints that is used to generate the data portion of a bar code applies to the data portion as a whole, rather than to subsets of the data portion. If a bar code includes only a data portion and no metadata portion (e.g., if the bar code does not include a start code and a stop code), then the set of constraints applies to the bar code as a whole, rather than to a subset of the bar code.

Figure 2A:
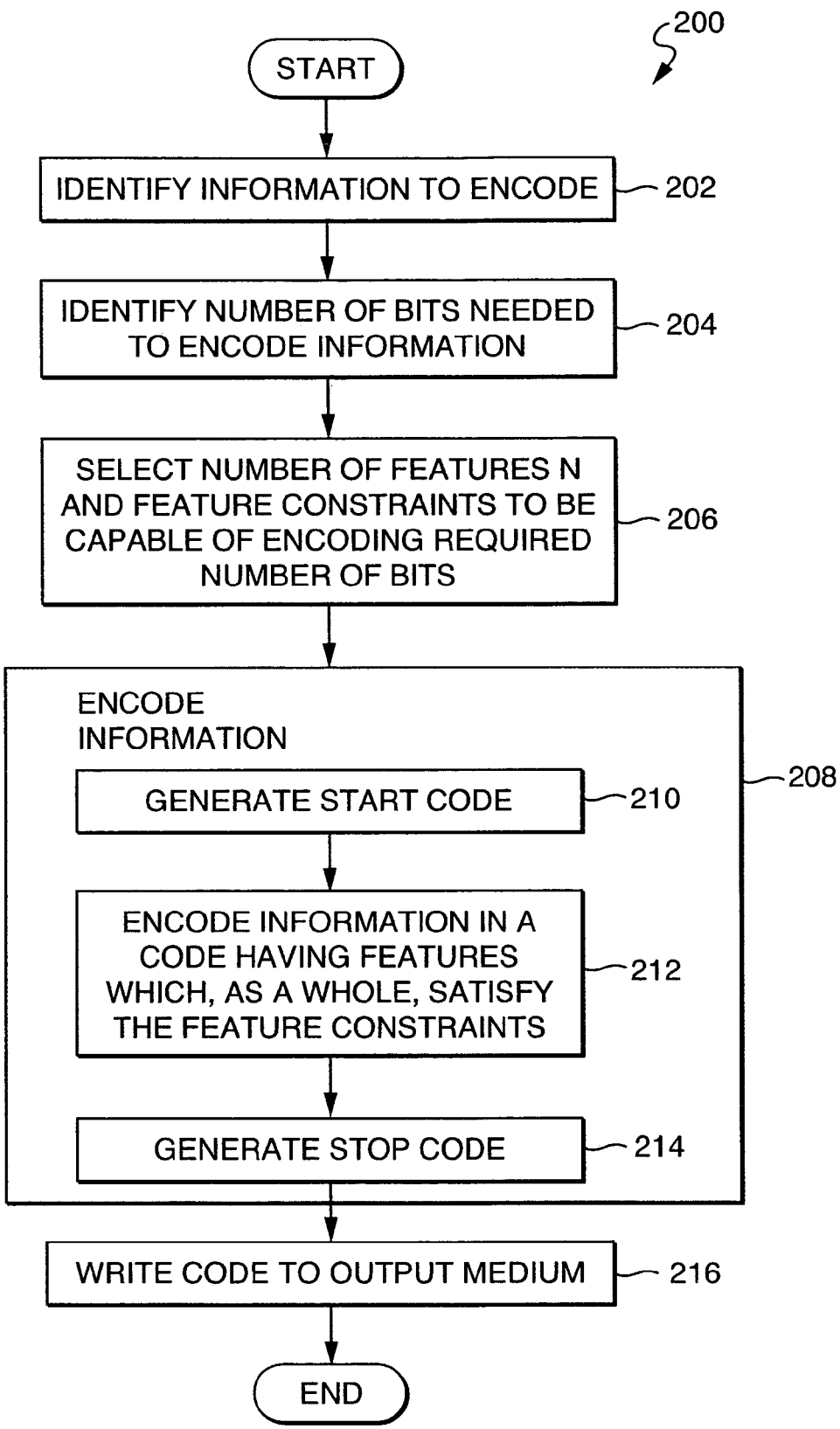
FIG. 2A is a flowchart of a method that is used to encode information according to one embodiment of the present invention.

Referring to FIG. 2A, a flowchart is shown of a method 200 that is used to encode information according to one embodiment of the present invention. The method 200 identifies information to encode (step 202). In one embodiment of the present invention, the information identified in step 202 is print medium property information.

The method 200 identifies the number of bits required to encode the information identified in step 202 (step 204). The method 200 selects a number of features N for the code and a set of feature constraints (such as feature widths and/or overall code length) that will enable the code to encode the number of bits identified in step 204 (step 206). N may be any positive integer greater than 1. An example of a set of constraints used by a conventional bar code system is the constraint imposed by the 2 of 5 bar code system which requires that a symbol contain 5 features, 2 of which are wide and 3 of which are narrow. As will be described in more detail below, the constraints selected in step 206 of the method 200 are not applied to multiple symbols in a single code, but rather to the entire data portion of the code as a whole regardless of the length of the data portion. Examples of other constraints that may be applied in embodiments of the present invention will be described below.

The method 200 encodes the information identified in step 202 in a code of N features (selected in step 206) that satisfies the feature constraints selected in step 206 (step 208). More specifically, the method 200 generates a start code (step 210). The method 200 encodes the information identified in step 202 in a code of N features that satisfies the feature constraints selected in step 204 (step 212). The data portion may not contain any internal start or stop codes.

The method 200 generates a stop code (step 214). The code generated by step 208 includes the start code generated in step 210, followed by the code generated in step 212, followed by the stop code generated in step 214. The method 200 writes the code generated in step 208 to an output medium (step 216). The data portion generated by the method 200 is an example of "data," and the start code and stop codes generated in steps 210 and 214, respectively, are examples of "metadata" as those terms are used herein.

Note that the code generated by the method 200 contains a single symbol, in the sense that the constraints identified in step 206 are applied to the features of the code's data portion as a whole rather than to multiple subsets of the code features. In the embodiment illustrated in FIG. 2A, the code generated by the method 200 does not include any internal start or stop codes. Although in the embodiment illustrated in FIG. 2A, the code generated by the method 200 includes an initial start code and a terminating stop code, this is not required. Rather, the code generated by the method 200 need not contain any start or stop codes.

Furthermore, the code generated by the method 200 contains a single symbol regardless of the value of N selected in step 206. In other words, the value of N may be increased without causing the resulting code to contain multiple symbols. Examples of techniques that may be applied to generate codes in this manner will be described below.

Figure 2B:
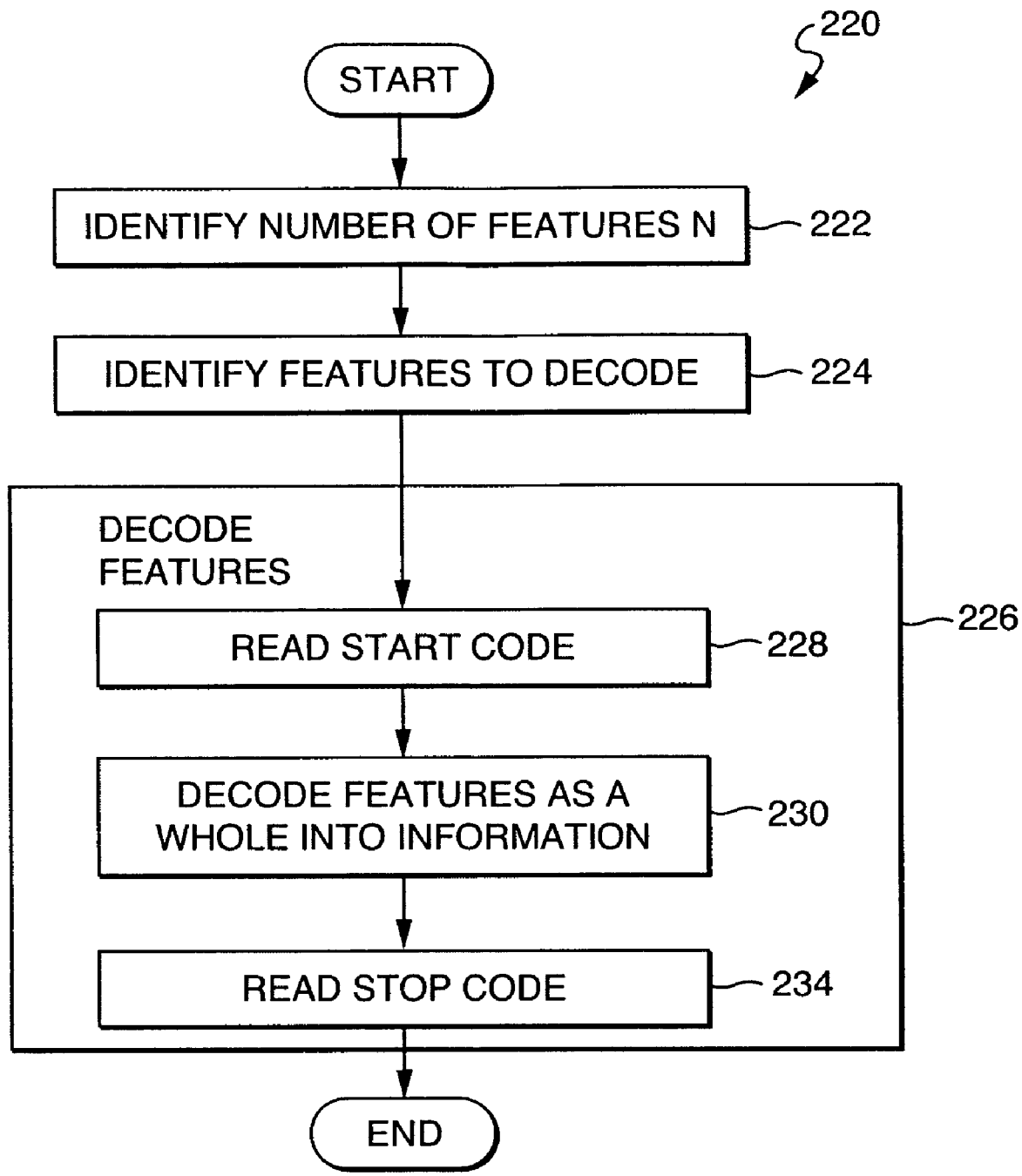
FIG. 2B is a flowchart of a method that is used to decode information according to one embodiment of the present invention.

Referring to FIG. 2B, a flowchart is shown of a method 220 that is used in one embodiment of the present invention to decode information that is encoded in a code generated by the method 200 of FIG. 2A. The code may be printed on an output medium and represent print medium property information. The method 220 identifies the number of features, N, of the code (step 222). N may be any positive integer greater than 1. Step 222 may, for example, be performed by reading the code using a bar code reader or other device and identifying the number of features in the code. The method 220 identifies the feature values to decode (step 224). Step 224 may be performed simultaneously with step 222.

The method 220 decodes the identified features into information without interpreting the features as a plurality of distinct symbols (step 226). More specifically, the method 220 optionally reads a start code 228 from the beginning of the set of features (step 228). The method 220 decodes features in the data portion following the optional start code into information without interpreting the features as a plurality of distinct symbols (step 230). Rather, as will be described in more detail below, the features in the data portion are interpreted as a whole. Note that the features read in step 230 need not include any features that are interpreted as start or stop codes.

The method 220 optionally reads a stop code (step 234). Since the code may omit the start and stop code, steps 228 and 234 may be omitted. Furthermore, the data portion of the code that is decoded by the method 200 contains a single symbol regardless of the value of N selected in step 206. In other words, the method 220 may be performed for codes having any number of features N. Examples of techniques that may be applied to decode codes in this manner will be described below.

In one embodiment of the present invention, a family of bar code systems is provided which is referred to herein as "recursive W of N" or "nested bar codes." Bar code systems in this family have symbol sets in which a single symbol may include features of varying widths. Let $I_s$ be the number of distinct widths in a particular bar code system S. Consider an example bar code system S in which $I_s=4$, i.e., in which there are features of four distinct widths. Assume for purposes of example, although it is not required, that each such width is an integral multiple of a minimum feature width.

Now let $N_i$ be the number of features whose width is equal to width $W_i$, for $1 \leq i \leq I_s$. Note that each width $W_i$ may be any width, so long as each width $W_i$ is distinct. In one embodiment, each value of $W_i$ is equal to the minimum feature width multiplied by i. The width distribution of the system S may be expressed using the notation $(N_1, N_2, N_3, \ldots N_{I_s})$. In such a case, in the example in which $I_s=4$, in any bar code there are $N_1$ features of width 1 (i.e., the minimum feature width), $N_2$ features of width 2 (i.e., double the minimum feature width), $N_3$ features of width 3 (i.e., triple the minimum feature width), and $N_4$ features of width 4 (i.e., four times the minimum feature width). The total number of combinations C available in such a case is given by Equation 1, where $N=N_1+N_2+N_3+N_4$:

$$C = \frac{N!}{N_1! N_2! N_3! N_4!} \quad \text{Equation 1}$$

Note that although Equation 1 represents the case in which $I_s=4$, Equation 1 may be generalized for any value of $I_s$, as given by Equation 2:

$$C = \frac{\left(\sum_{i=1}^{I_s} N_i\right)!}{\prod_{i=1}^{I_s} N_i!} \quad \text{Equation 2}$$

Figure 3A:
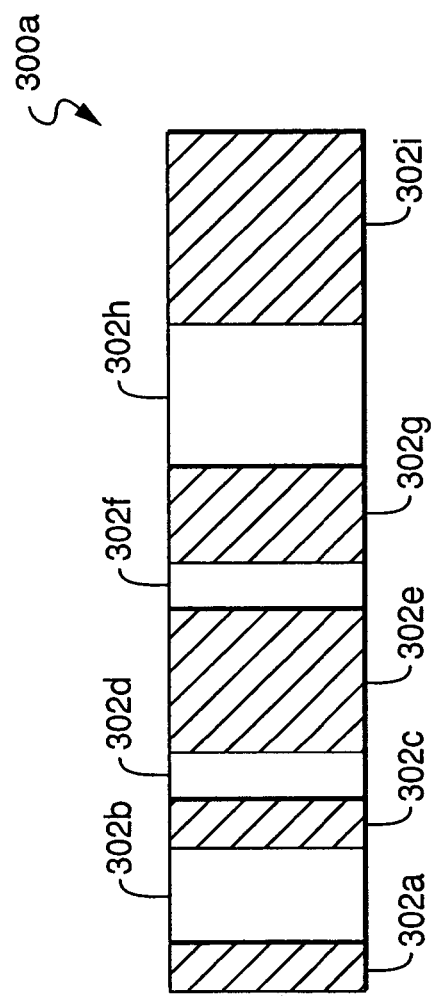
FIGS. 3A-3G illustrate bar codes and corresponding nested patterns according to one embodiment of the present invention.
Figure 3B:
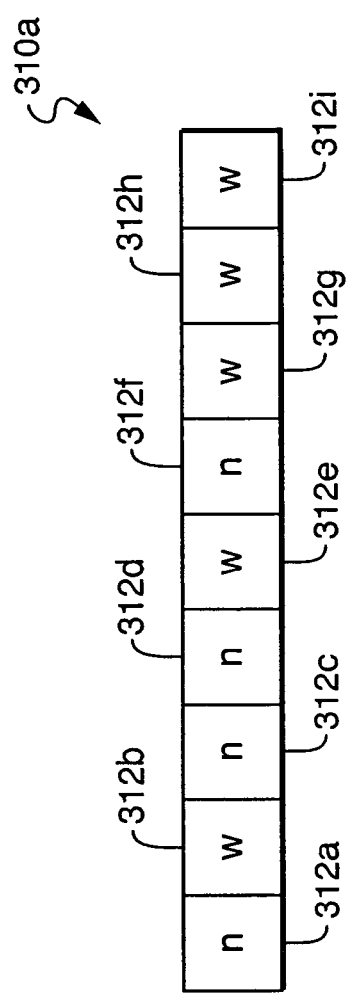

For purposes of example, consider a case in which $N_1=4$, $N_2=2$, $N_3=2$, and $N_4=1$. An example of a bar code 300a satisfying these constraints is shown in FIG. 3A. The bar code 300a includes a total of $N=9=N_1+N_2+N_3+N_4$ features 302a-i. The width array for the bar code 300a is (1,2,1,1,3,1,2,3,4); the elements of the array correspond to the widths of the features 302a-i. Note that there are $N_1=4$ features (302a, 302c, 302d, 302f) of single width, $N_2=2$ features (302b, 302g) of double width, $N_3=2$ features (302e, 302h) of triple width, and $N_4=1$ feature (302i) of quadruple width. Recall, however, that the widths $W_1$, $W_2$, $W_3$, and $W_4$ need not be consecutive integral multiples of the minimum feature width, but rather may be any set of distinct features widths.

Figure 4A:
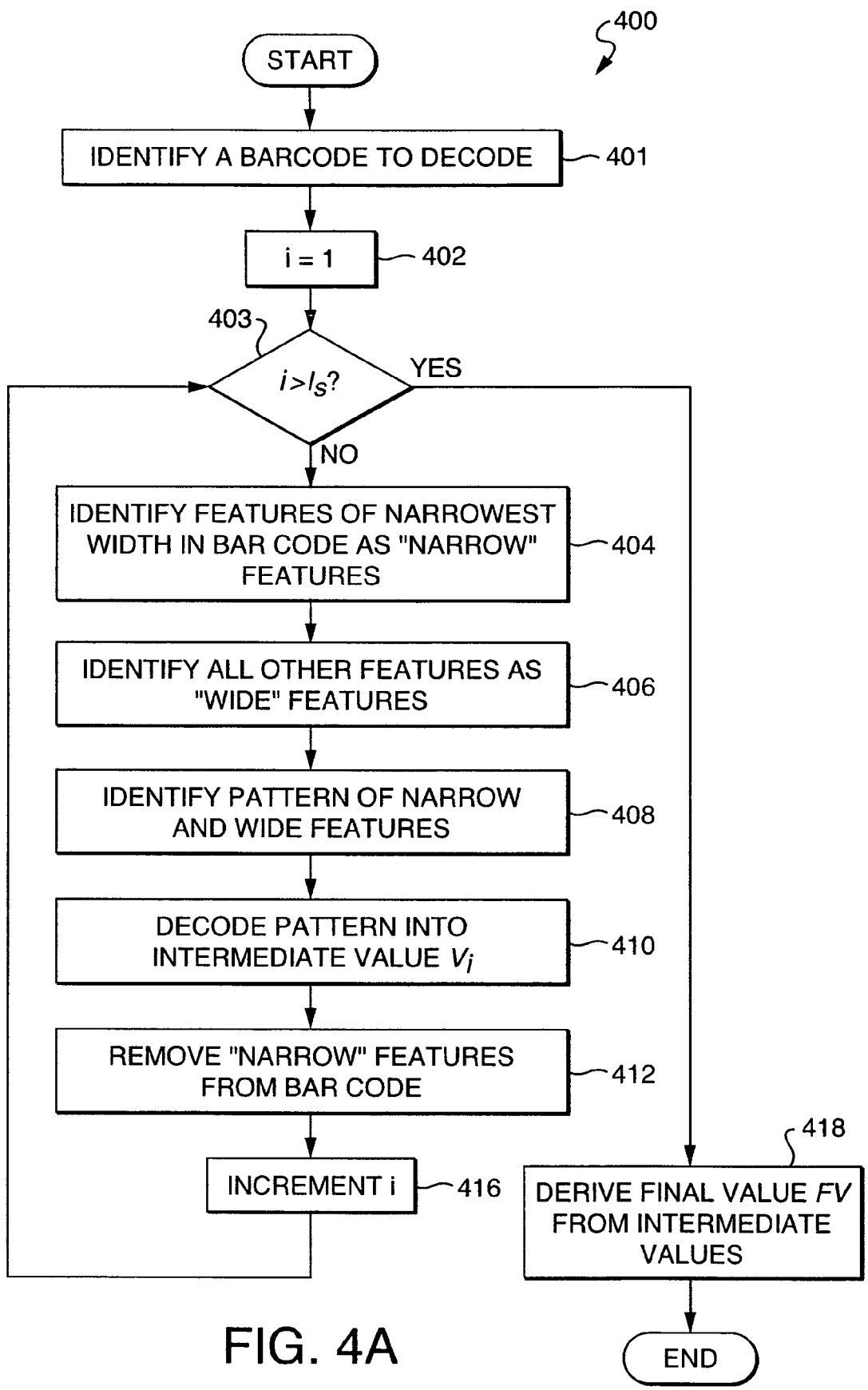
FIG. 4A is a flowchart of a method for decoding a bar code according to one embodiment of the present invention.

Referring to FIG. 4A, a flowchart is shown of a method 400 for decoding a bar code (such as the bar code 300a) that is encoded according to such a system. The method 400 identifies a bar code to decode (step 401) and initializes an index variable i to one (step 402).

The method 400 determines whether i is greater than $I_s$ (the number of distinct feature widths) (step 403). If not, the method 400 continues processing with step 404. In the present example, i=1 and $I_s=4$, so the method 400 proceeds to step 404.

The method 400 identifies features of the narrowest width in the bar code as "narrow" features (step 404). For example, in the bar code 300a illustrated in FIG. 3, the narrowest width is single width (width 1). Features 302a, 302c, 302d, and 302f have this width. Therefore, the method 400 would identify features 302a, 302c, 302d, and 302f of bar code 300a as "narrow" in step 404.

The method 400 identifies all remaining features in the bar code as "wide" features (step 406). For example, the method 400 would identify features 302b, 302e, and 302g-i as "wide" features in step 406. The method 400 identifies a pattern formed by the narrow and wide features identified in steps 404 and 406, respectively (step 408). For example, referring to FIG. 3B, a pattern 310a is shown representing the "narrow" and "wide" features of the bar code 300a (FIG. 3A), where "n" represents a "narrow" feature and "w" represents a "wide" feature. The pattern 310a includes elements 312a-i, which have a one-to-one correspondence with features 302a-i in the bar code 300a (FIG. 3A).

The method 400 decodes the pattern into an intermediate value $V_i$ (step 410). This decoding may be performed in any manner (such as by using a lookup table and/or algorithm), and the resulting value may be any kind of a value, such as a number, character, or an enumerated type. An example of techniques that may be used to decode the pattern in step 410 will be described below with respect to FIG. 6. Assume for purposes of example that in this case $V_1=103$.

The method 400 removes the "narrow" features from the bar code 300a (step 412). For example, removing the "narrow" (single width) features from the bar code 300a illustrated in FIG. 3A results in the "bar code" 300b illustrated in FIG. 3C. Note that the "bar code" 300b is not a true bar code but rather an intermediate structure that is used for purposes of decoding the bar code 300a. Bar code 300b includes features 302b, 302e, and 302g-i. Note that the narrowest features 302b and 302g in this new bar code 300b have width 2. Note that although the present description refers to "removing" narrow features from the bar code, such "removal" may be performed without deleting elements from a representation of the bar code. Rather, the term "removal" refers generally to any technique that removes the bar code's "narrow" features from consideration in subsequent steps of the method 400, as will be described in more detail below.

The method 400 increments the value of i (step 416) and returns to step 403. If $i \leq I_s$ (step 403), the method 400 continues processing with step 404. In the present example, i=2 and $I_s=4$, so the method 400 continues to step 404.

In this iteration of step 404, the features having a double width (width=2) are interpreted as the "narrow" features (step 404). In the present example, these are features 302b and 302g. All other features are interpreted as "wide" features (step 406). In the present example, these are features 302e, 302h, and 302i.

Figure 3C:
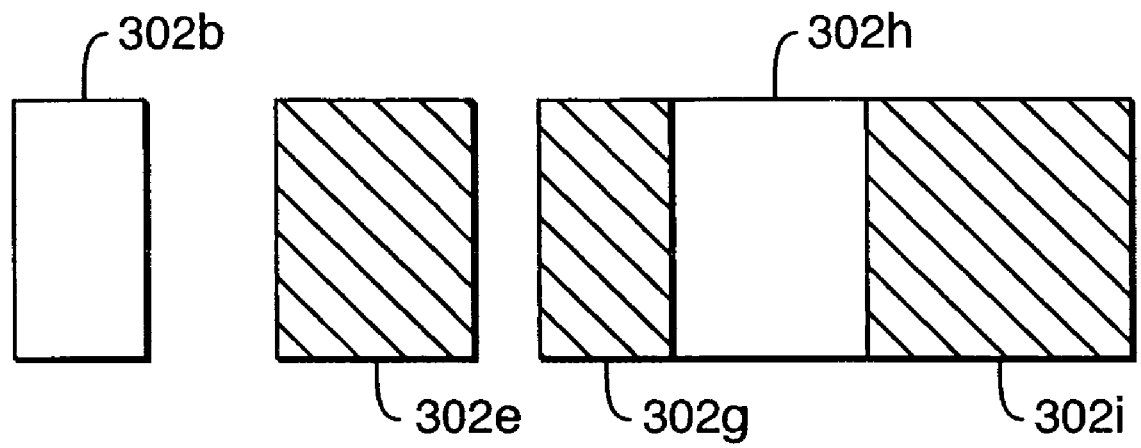
Figure 3D:
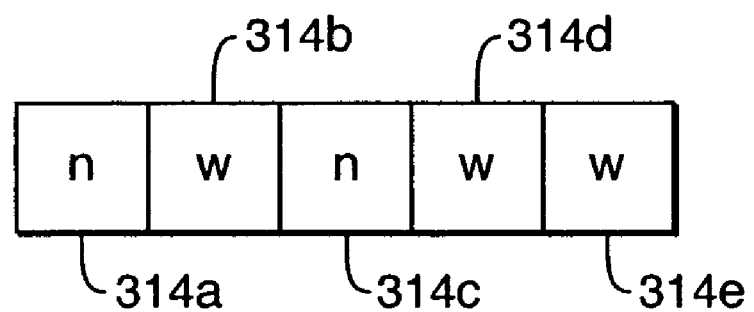

The method 400 identifies a pattern formed by the narrow and wide features identified in steps 404 and 406, respectively (step 408). For example, referring to FIG. 3D, a pattern 310b is shown representing the "narrow" and "wide" features of the bar code 300b (FIG. 3C). The pattern 310b includes elements 314a-e, which have a one-to-one correspondence with features 302b, 302e, 302g, 302h, and 302i in the bar code 300a (FIG. 3A). The method 400 decodes the pattern into another intermediate value $V_i$ (step 410). Assume for purposes of example that in this case $V_2=8$.

The method 400 removes the "narrow" features from the bar code (step 412). For example, removing the "narrow" (double width) features from the bar code 300b illustrated in FIG. 3C results in the bar code 300c illustrated in FIG. 3E. Note that the narrowest features 302e and 302h in this new bar code 300c have width 3.

The method 400 increments the value of i (step 416) and returns to step 403. If i≦$I_s$ (step 403), then the method 400 continues processing with step 404. In the present example, i=3 and $I_s$=4, so the method 400 continues to step 404.

In this iteration of step 404, the features 302e and 302h having a triple width (width=3) are interpreted as "narrow" features (step 404). All other features are interpreted as "wide" features (step 406). In the present example, the only such feature is feature 302i.

Figure 3E:
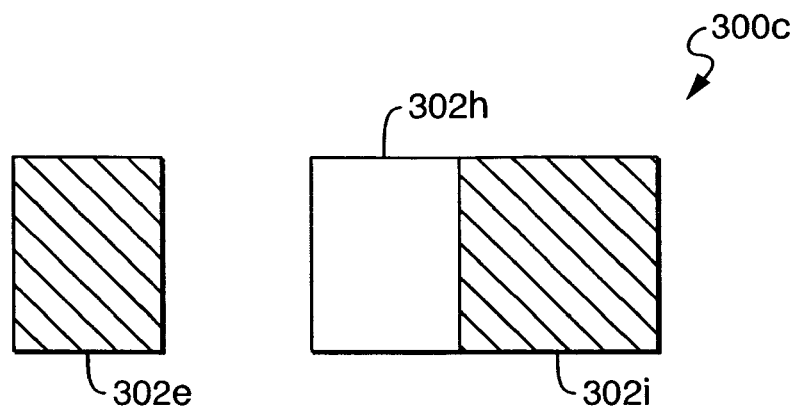

The method 400 identifies a pattern formed by the narrow and wide features identified in steps 404 and 406, respectively (step 408). For example, referring to FIG. 3F, a pattern 310c is shown representing the "narrow" and "wide" features of the bar code 300c (FIG. 3E). The pattern 310c includes elements 316a-c, which have a one-to-one correspondence with features 302e, 302h, and 302i in the bar code 300a (FIG. 3A). The method 400 decodes the pattern 310c into another intermediate value $V_i$ (step 410). Assume for purposes of example that in this case $V_3=2$.

The method 400 removes the "narrow" features from the bar code (step 412). For example, removing the "narrow" (triple width) features from the bar code 300c illustrated in FIG. 3E results in the bar code 300d illustrated in FIG. 3G. Note that the only feature 302i in this new bar code 300d has width 4.

The method 400 increments the value of i (step 416) and returns to step 403. Since i=4 and $I_s$=4, the method 400 continues to step 404. Since there is now only one feature having one possible value, $V_4$=0. Once i is next incremented in step 416, i=5 and $I_s$=4. Therefore, after step 403 the method 400 proceeds to step 418, in which the method 400 derives a final decoded value from the decoded values $V_i$, for 1≦i≦$I_s$. Note that in the embodiment illustrated in FIG. 4A, the total number of decoded values $V_i$ is always equal to the number of distinct widths, $I_s$. Also note that step 418 is optional; the individual values of $V_i$ may be used without deriving a single final decoded value from them. If step 418 is performed, however, it may be performed in any of a variety of ways.

Note that although the method 400 illustrated in FIG. 4A traverses features beginning with the narrowest and ending with the widest, the method 400 may traverse features in any order. Furthermore, although the method 400 processes features from left to right, this is not required. Rather, the method 400 may process features in any order, such as right to left or middle out.

Figure 3F:
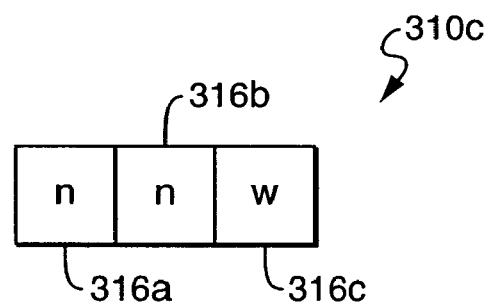
Figure 4B:
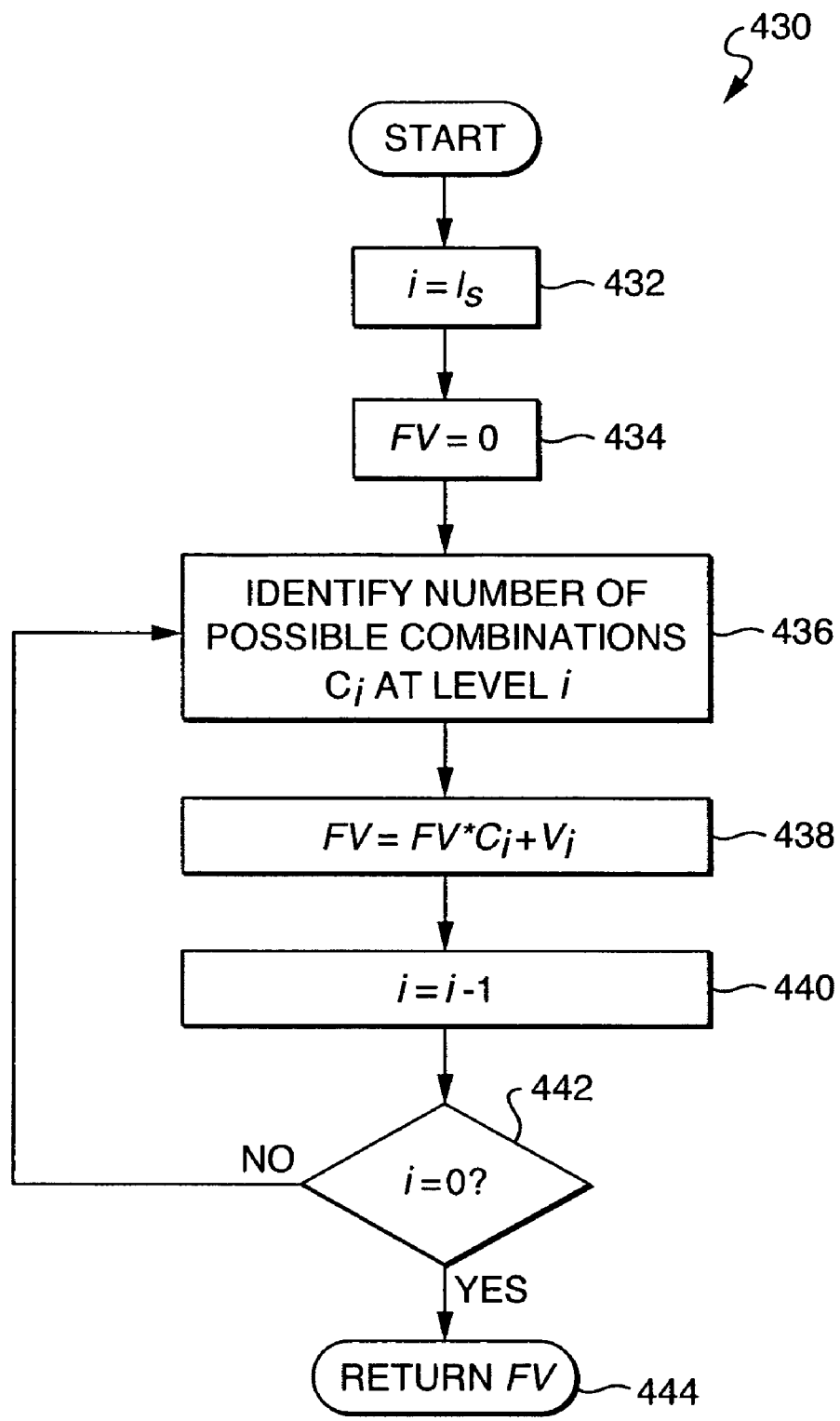
FIG. 4B is a flowchart of a method for combining multiple values derived from a bar code into a single value according to a first embodiment of the present invention.

For example, referring to FIG. 4B, a flowchart is shown of a method 430 that is performed in one embodiment of the present invention to implement step 418. Before describing the operation of the method 430, the concept of a bar code "level" will be introduced. In one embodiment of the present invention, a bar code, such as the bar code 300a illustrated in FIG. 3A, is treated as containing a plurality of levels. The bar code itself (e.g., bar code 300a, interpreted as "narrow" and "wide" features in 310a of FIG. 3B) is level 1; the bar code that results from removing the first set of "narrow" features (e.g., bar code 300b, interpreted as in 310b of FIG. 3D) is level 2; the bar code that results from removing the second set of "narrow" features (e.g., bar code 300c, interpreted as in 310c of FIG. 3F) is level 3; and so on.

Returning to FIG. 4B, the method 430 initializes the value of index variable i to the value of $I_s$ (step 432). For example, if $I_s$=4, then i=4 after step 432. The method 430 initializes the value of the final decoded value FV to zero (or optionally to the result of a previous barcode calculation or some other calculation) (step 434).

The method 430 identifies the number $C_i$ of possible patterns at level i (step 436). For example, if i=2, then $C_i$ would represent the number of combinations of patterns at level 2, i.e., the number of combinations of patterns based on bar codes with width 2 and wider.

The method multiplies FV by $C_i$ and adds the intermediate decoded value $V_i$ at level i to the resulting product to obtain a new value for FV (step 438). The method 430 decrements the value of i (step 440). Steps 436-440 are repeated until i=0 (step 442), when the current value of FV is returned as the final value of FV (step 444).

Figure 3G:
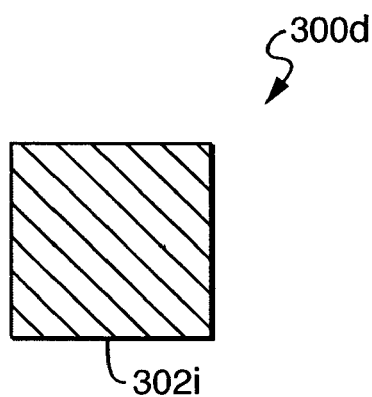

Consider the application of method 430 to the bar code 300a illustrated in FIG. 3A. Let $B_i$ be the bar code at level i. For example, $B_1$ is bar code 300a (FIG. 3A), $B_2$ is bar code 300b (FIG. 3C), $B_3$ is bar code 300c (FIG. 3E), and $B_4$ is bar code 300d (FIG. 3G). Similarly, let $P_i$ be the pattern derived from the bar code at level i. For example, $P_1$ is pattern 310a (FIG. 3B), $P_2$ is pattern 310b (FIG. 3D), and $P_3$ is pattern 310c (FIG. 3F).

At level i=1 (pattern 310a in FIG. 3B), there are five wide features and four narrow features, yielding 126 unique combinations. In other words, $C_1$=126. Assume for purposes of example that pattern $P_1$ 310a decodes to the number 103. Therefore, $V_1$=103.

At level i=2 (pattern 310b in FIG. 3D), there are three wide features and two narrow features, yielding 10 unique combinations. In other words, $C_2$=10. Assume for purposes of example that pattern $P_2$ 310b decodes to the number 8. Therefore, $V_2$=8.

At level i=3 (pattern 310c in FIG. 3F), there is one wide feature and two narrow features, yielding 3 unique combinations. In other words, $C_3$=3. Assume for purposes of example that pattern $P_3$ 310c decodes to the number 2. Therefore, $V_3$=2. Because the pattern (not shown) corresponding to bar code $B_4$ 300d (FIG. 3G) has only a single width, the pattern $P_4$ decodes into the value zero. Therefore, $V_4$=0.

Note that the method 430 illustrated in FIG. 4B effectively treats bar code $B_s$ as the least significant portion of the final value FV. The method treats bar code $B_2$ as the next least significant portion of FV, and so on. Using the particular width distribution and example bar code B described above, the method 430 illustrated in FIG. 4B would produce the result: $((V_4*C_3+V_3)*C_2+V_2)*C_1+V_1=(2*10+8)*126+103=3631$.

Figure 4C:
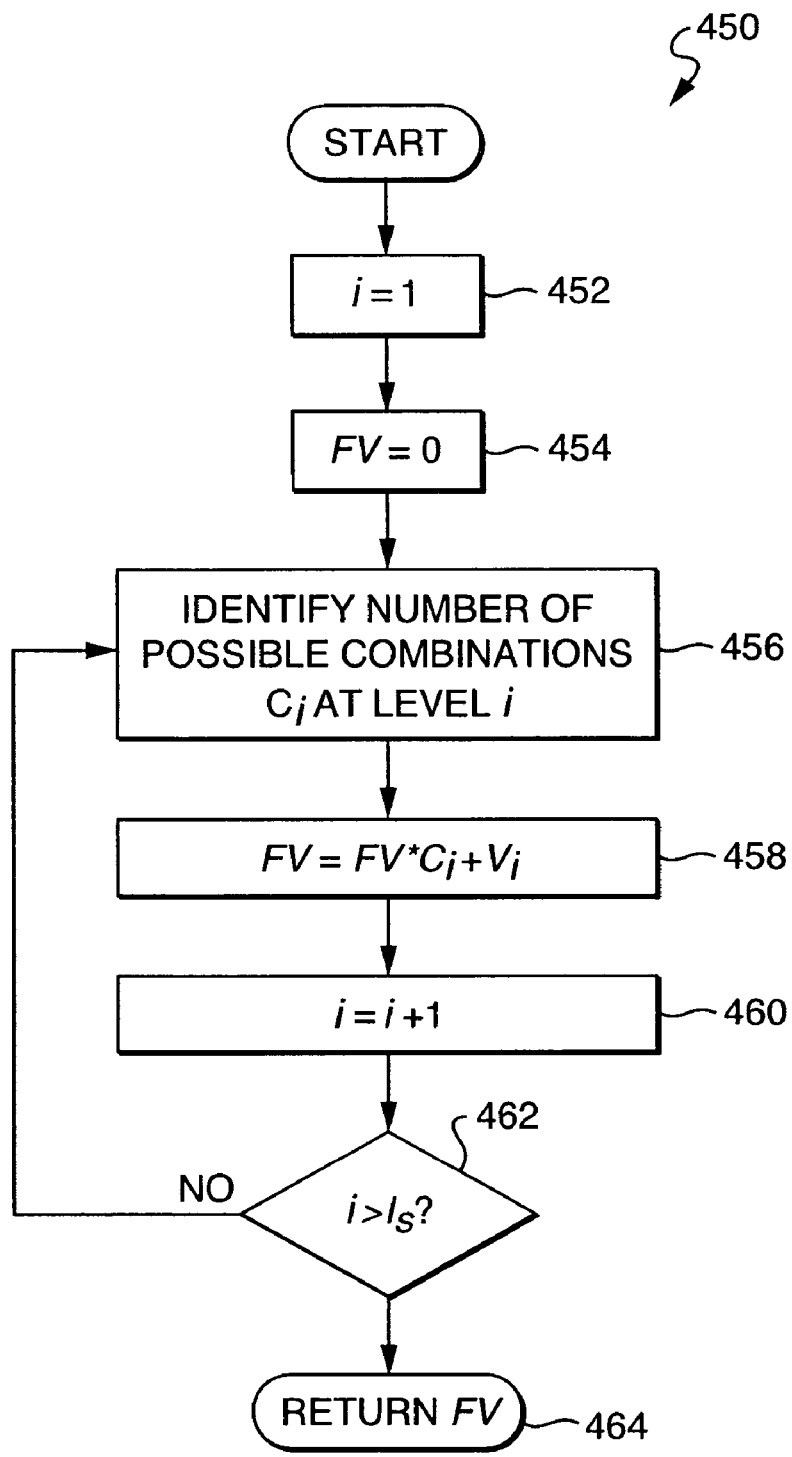
FIG. 4C is a flowchart of a method for combining multiple values derived from a bar code into a single value according to a second embodiment of the present invention.

The meaning of the bar codes at each level i may be reversed by interpreting $B_1$ as the most significant portion of the final value FV, interpreting $B_2$ as the next-most significant portion of the final value FV, and so on. Referring to FIG. 4C, a flowchart is shown of a method 450 that operates according to this principle.

The method 450 initializes the value of index variable i to the value of 1 (step 452). The method 450 initializes the value of the final decoded value FV to zero (or optionally to the result of a previous barcode calculation or some other calculation) (step 454).

The method 450 identifies the number $C_i$ of possible combinations of patterns at level i (step 456). The method 450 multiplies FV by $C_i$ and adds the intermediate decoded value $V_i$ at level i to the resulting product to obtain a new value for FV (step 458). The method 450 increments the value of i (step 460). Steps 456-460 are repeated until i>$I_s$ (step 462). The final value of FV is returned as the decoded value of the code (step 464). Applying the method 450 to the example provided above yields FV=(103*10+8)*3+2=3116.

Note that the methods shown in FIGS. 4B and 4C are merely examples of methods that may be used to combine the values $V_i$ into a final value. Other methods may be used to combine the values $V_i$ into a final value. For example, the methods shown in FIGS. 4A and 4B may be combined using techniques well-known to those of ordinary skill in the art to produce recursive functions that compute the value of FV. The same is true for the methods shown in FIGS. 4A and 4C.

In each of the example bar code systems described above, bar codes have a single width distribution within the system. If a single width distribution is not required, the number of available combinations increases. There are several ways to make use of multiple distributions.

Assume, for example, that a particular bar code system imposes constraints on the length, total number of features, widths of individual features, the number of one particular feature (or width), and/or other bar code characteristics. Multiple width distributions may satisfy the combination of requirements, any one of which may be used in a system requiring a single width distribution. Further assume that the range of values to be encoded by the system exceeds the range available using any one width distribution that satisfies the combination of requirements. For example, if a particular bar code system allows bar codes using exactly five features with a length of exactly 11 units and up to three distinct feature widths, three different width distributions are possible: (a) (0,4,1), yielding 5 unique combinations; (b) (1,2,2), yielding 30 unique combinations; and (c) (2,0,3), yielding 10 unique combinations. Therefore, the total number of unique combinations in such a system is 45 (5+30+10). Also, assume that the particular bar code system in this example must encode a range of numbers from 0 through 42. In one embodiment of the present invention, each specific width distribution represents a specific range of numbers. For example, width distribution (1,2,2), with 30 unique combinations, may represent numbers 0 through 29. Width distribution (2,0,3), with 10 unique combinations, may represent numbers 30 through 39. Width distribution (0,4,1), with 5 unique combinations, may represent numbers 40 through 42. Note that only 3 out of the 5 combinations in the last distribution would need to be used in this example. Note also that the particular ordering of the distributions may be chosen in any manner.

Figure 4D:
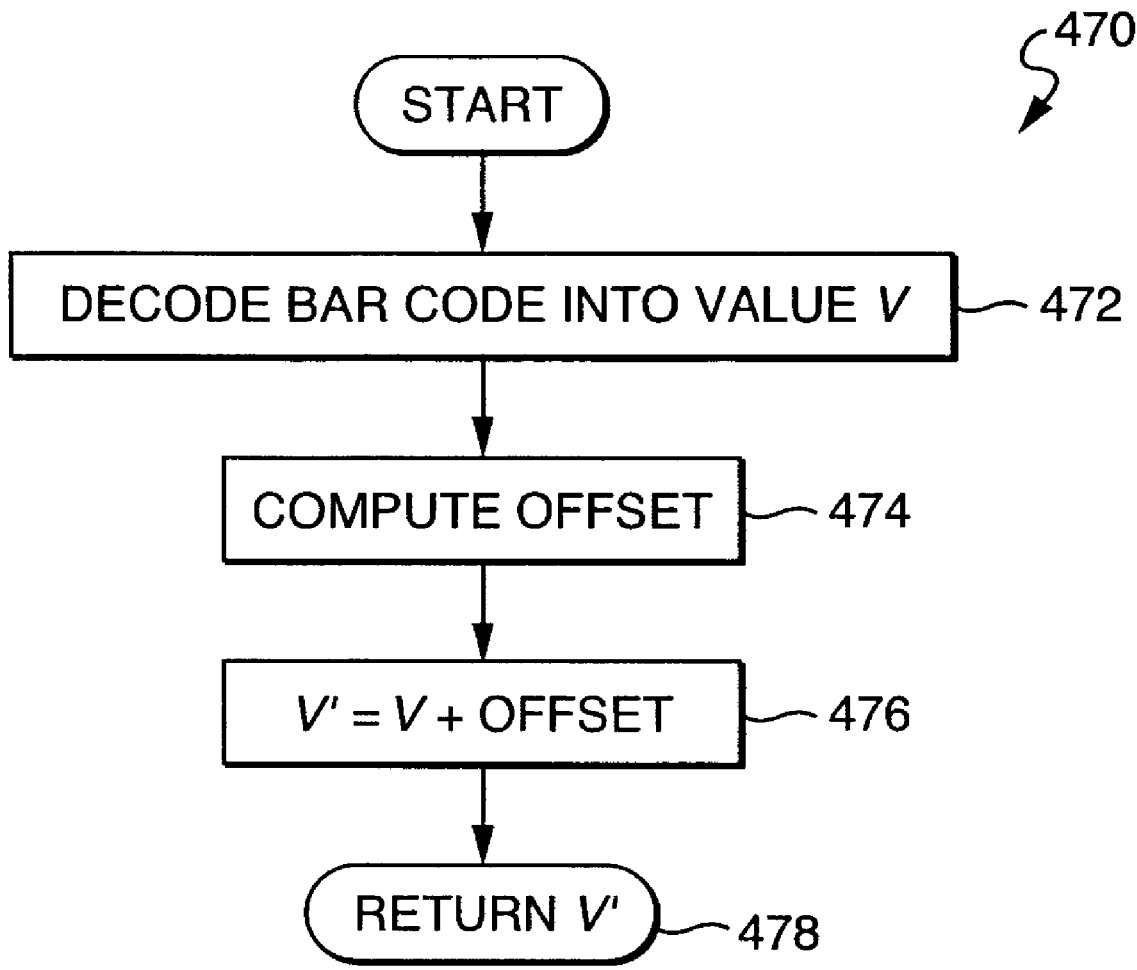
FIG. 4D is a flowchart of a method that is performed in one embodiment of the present invention to assign a value to a bar code in a system that recognizes multiple width distributions.

Those having ordinary skill in the art will appreciate how to extend the decoding techniques described above with respect to FIGS. 4A-4C to decode codes that are encoded in accordance with such constraints. For example, referring to FIG. 4D, a flowchart is shown of a method 470 that is performed in one embodiment of the present invention to assign a value to a bar code in a system that recognizes multiple width distributions. The method 470 decodes the bar code into a value V (step 472). Step 472 may, for example, be performed using the methods shown in FIGS. 4A and 4B or FIGS. 4A and 4C. An offset value is computed (step 474) based on the particular width distribution of the decoded bar code. In the example above, if the width distribution of the bar code is (1,2,2), then the offset is 0 because there are no preceding width distributions. If the width distribution is (2,0,3), then the offset is 30; the preceding width distribution, (1,2,2), has 30 unique combinations. If the width distribution is (0,4,1), then the offset is 40. The offset is added to the value V to produce a value V' (step 476) that is used as the decoded value of the bar code (step 478).

The systems described so far use only a single bar code. There are situations, however, where more than one code may be used. These codes may have any combination of width distributions that satisfy the requirements of the system. They may be treated as independent entities, with each functioning as described above. Alternatively, the codes may be combined to create a single number. For example, assume that there are two bar codes, X and Y. Each of codes X and Y may have one or more width distributions as discussed above. In one embodiment of the present invention, the two codes are combined by decoding the number represented by code X using the techniques described above. The result is multiplied by the number of unique combinations available for code Y. The resulting product is then added to the number represented by code Y.

Another method of using multiple codes is to break up one long code into two or more sections. Each section may be read by a separate sensor. The resulting width arrays from the sections may be concatenated to form a single width array that may then be decoded as described previously.

Another method of using multiple codes is to have two or more codes, with each code having one or more allowed width distributions, and with at least one of the codes having two or more allowed distributions. The distribution of the distributions can, in itself, be used to encode information in addition to, and independent of, any information encoded within the codes themselves, as described above. For example, assume that there are two codes, X and Y. Code X may have one of width distributions A or B, each of which differs from the other. Code Y may have one of width distributions D, E, or F, each of which differs from the other. One or more of width distributions A and B, however, may match width distributions D, E, or F. The codes X and Y are handled as above with respect to decoding and combining the numbers. In addition, one looks at the distributions used in X and Y and can assign values for the different pairings as shown, for example, in Table 1.

TABLE 1

| X distribution | Y distribution | Assigned Value |
| --- | --- | --- |
| A | D | 0 |
| A | E | 1 |
| A | F | 2 |
| B | D | 3 |
| B | E | 4 |
| B | F | 5 |

This information can be combined with the number(s) represented by X and Y. Those having ordinary skill in the art will appreciate how to encode information in accordance with the decoding techniques just described.

The preceding discussion describes features of bar code systems implemented according to various embodiments of the present invention. In particular, it was stated above with respect to step 410 of method 400 (FIG. 4A) that each pattern $P_i$ may be decoded into a corresponding value $V_i$ using any of a variety of methods. Examples of techniques for decoding patterns, such as those illustrated in FIG. 3B, FIG. 3D, and FIG. 3F, will now be described. Furthermore, examples of techniques for encoding values into such patterns will be described.

Consider, for example, a bar code system S in which bar codes are limited to having a total of N features, of which W features are wide features and N-W of which are narrow features. Assume, for purposes of example that N=5 and W=2. In other words, there are five features, two of which are wide and three of which are narrow. In one embodiment of the present invention, the digits 0-9 are mapped to symbols according to Table 2:

TABLE 2

| Symbols | Digits |
|---------|--------|
| Wwnnn | 0 |
| Wnwnn | 1 |
| Wnnwn | 2 |
| Wnnnw | 3 |
| Nwwnn | 4 |
| Nwnwn | 5 |
| Nwnnw | 6 |
| Nnwwn | 7 |
| Nnwnw | 8 |
| Nnnww | 9 |

Note that the sequence of symbols in the left-hand column of Table 2 may be generated by beginning with a symbol in which the wide features are on the left-hand side of the symbol and the narrow features are on the right-hand side, as indicated by the symbol wwnnn in the first row of Table 2. This first symbol is mapped to the digit 0.

To generate the symbol that maps to the next digit (1), the rightmost wide feature is moved one position to the right, resulting in the symbol wnwnn, as indicated in the second row of Table 2. For 2, the w is moved to the right again (i.e., wnnwn). To generate the symbol that maps to the next digit (2), the rightmost wide feature is moved one position to the right, resulting in the symbol wnnwn, as indicated in the third row of Table 2. This procedure is repeated until the rightmost wide feature is in the rightmost position of the symbol, indicated by the symbol wnnnw in the fourth row of Table 2, which maps to the digit 3.

The next symbol is generated by returning to the original symbol (wwnnn) and moving both wide features one position to the right, to obtain the symbol nwwnn, as shown in the fifth row of Table 2. This symbol maps to the digit 5. The procedure described above is repeated to generate symbols corresponding to the remaining digits.

Figure 5A:
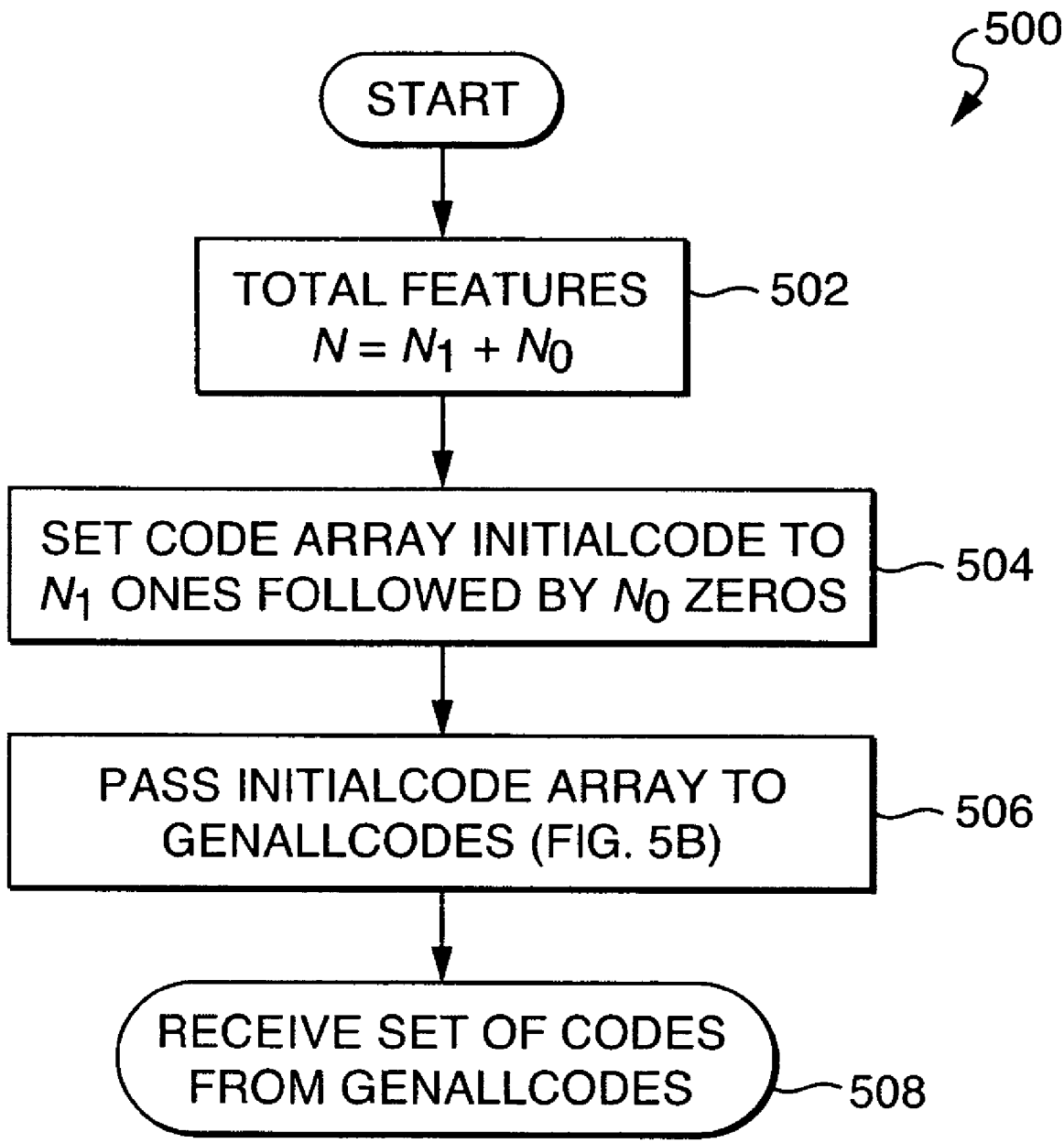
FIGS. 5A-5B are flowcharts of a recursive procedure for generating a full set of bar codes within a bar code system according to one embodiment of the present invention.
Figure 5B:
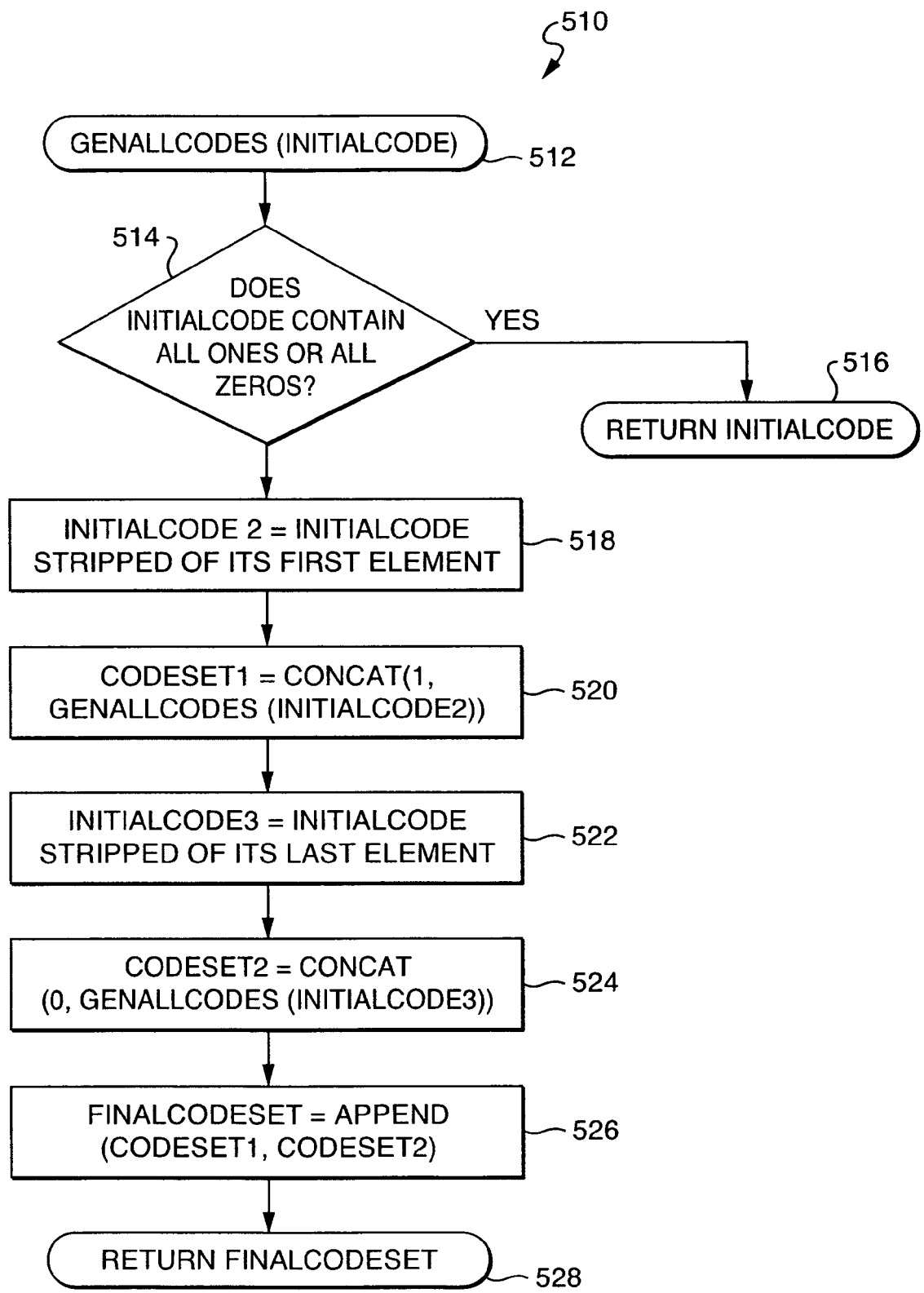

Those having ordinary skill in the art will appreciate that the techniques described above with respect to Table 2 may be applied more generally to codes having any number of features, in which any number of features are wide and any number of features are narrow. In the discussion that follows, note that the embodiments illustrated in FIGS. 5A-5B and 6A-6B involve codes having only two feature values, and that the embodiments illustrated in FIGS. 6C-6D indicate how to generalize to codes having any number of feature values. Referring to FIGS. 5A-5B, a recursive procedure is shown for generating a full set of codes such as the set of codes shown in Table 2.

Referring to FIG. 5A, an initialization method 500 is shown that identifies the total number of features N as the sum of the number $N_1$ of features having width 1 and the number $N_0$ of features having width 0 (step 502). Note that terms such as "width 1" and "width 0" in this discussion refer to enumerated values which may translate not only into widths (in this case, width 1=wide and width 0=narrow) of barcode features but more generally into any kind of feature of any code (e.g. width 1=red and width 0=blue).

A code array named InitialCode is initialized to contain $N_1$ ones followed by $N_0$ zeros (step 504). For example, if $N_1$=2 and $N_0$=3, then InitialCode is initialized to the code 11000. The InitialCode array is passed to a method named GenAllCodes (step 506), an embodiment of which is illustrated in FIG. 5B. As will now be described in more detail, the method GenAllCodes generates a full set of codes (such as the set of codes shown in Table 2) and returns the set of codes back to the method 500 shown in FIG. 5A (step 508).

Referring now to FIG. 5B, a flowchart is shown of the GenAllCodes method 510 according to one embodiment of the present invention. The method 510 receives the code array InitialCode (step 512). The method 510 determines whether the code array InitialCode contains all ones or all zeros (step 514). If the code array InitialCode contains all ones or all zeros, then the method 510 returns a single code consisting of the InitialCode code array (step 516).

Otherwise, the method 510 strips InitialCode of its first element and provides the remaining code elements as a code array named InitialCode2 (step 518). For example, if InitialCode were the code 11000, then InitialCode2 would be the code 1000. The method 510 calls itself with InitialCode2 as the initial code to generate a set of codes, and concatenates a one to the beginning of each code in the set of codes to produce a set of codes named CodeSet1 (step 520).

Similarly, the method 510 strips InitialCode of its last element and provides the remaining code elements as a code array named InitialCode3 (step 522). For example, if InitialCode were the code 11000, then InitialCode3 would be the code 1100. The method 510 calls itself with InitialCode3 as the initial code to generate a set of codes, and concatenates a zero to the beginning of each code in the set of codes to produce a set of codes named CodeSet2 (step 524).

The method 510 produces a final set of codes by appending the code set CodeSet2 to the end of the code set CodeSet1 (step 526). As a result, FinalCodeSet contains CodeSet1 followed by CodeSet2. Finally, the method 510 returns the final code set (FinalCodeSet) (step 528). If $N_1$=2 and $N_0$=3, for example, then the final code set will be equivalent to the code set shown in Table 2.

Figure 6A:
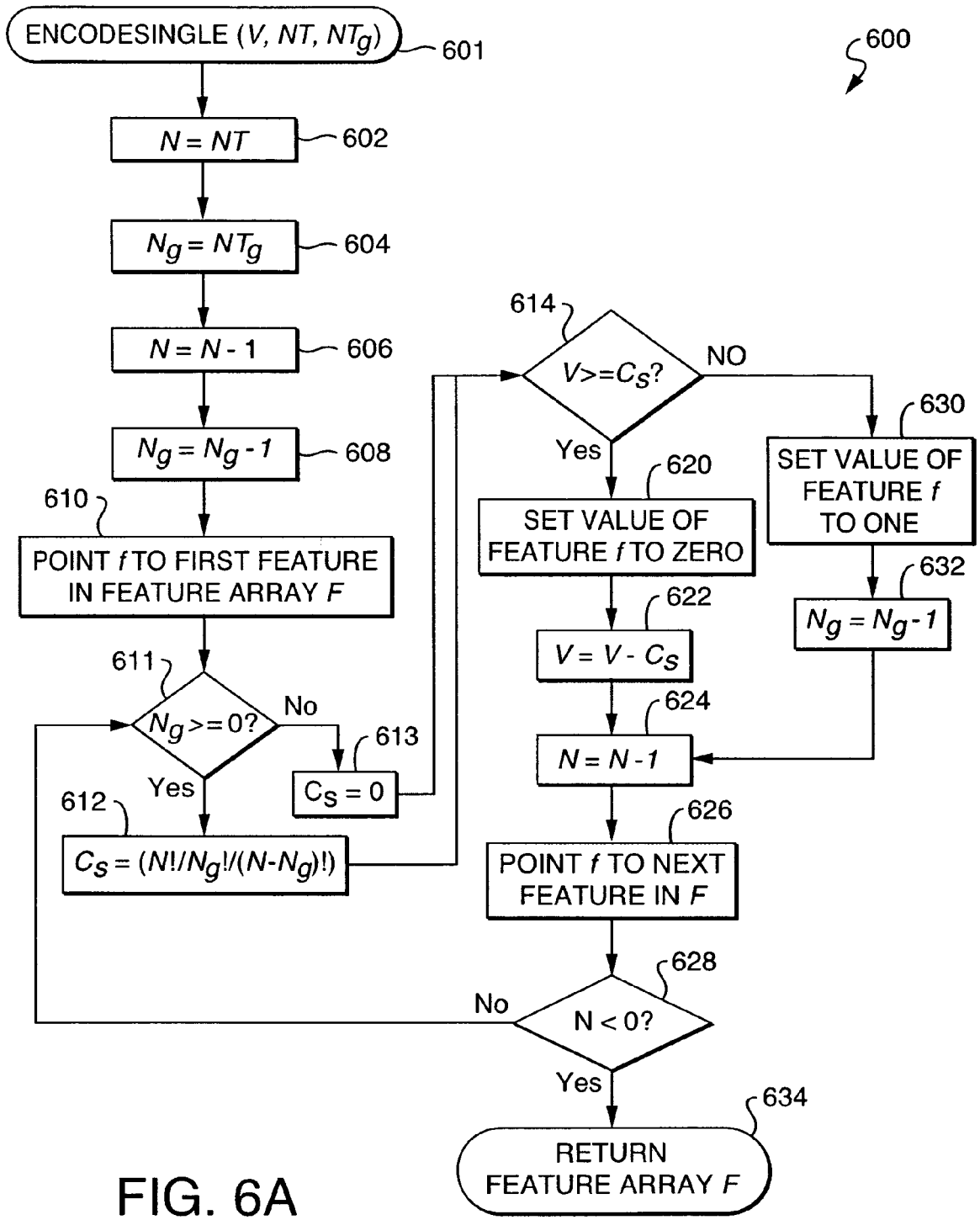
FIG. 6A is a flowchart of a method for encoding values into a code according to one embodiment of the present invention.

Referring to FIG. 6A, a flowchart is shown of a method 600 for encoding values into a code having the kind of ordered sequence shown in Table 2 according to one embodiment of the present invention. The method 600 receives: (1) a value V to encode in a code feature array F; (2) the total number NT of features in the code to be generated; and (3) the number $NT_g$ of features having feature values other than zero (step 601).

Although the code to be generated may be a bar code, this is not required. Rather, the code may be any kind of code having any kind of features. Distinct feature values may be enumerated using sequential integral values starting at zero. For example, in a bar code having features with three distinct widths, each distinct width is an example of a distinct feature. One of the widths may be assigned the feature value 0, another one of the widths may be assigned the feature value 1, and another one of the widths may be assigned the feature value 2. Values may be assigned to distinct features in any order. For example, although the narrowest feature in a bar code may be assigned the lowest value (e.g., 0) and the widest feature may be assigned the highest (e.g., 2), this is not required. For purposes of generality the remaining discussion of FIG. 6 will refer to enumerated feature values rather than to characteristics (such as width) of the features themselves.

The method 600 assigns the value of NT (the total number of features) to a variable N (step 602) and assigns the value of $NT_g$ (the total available number of features with feature values greater than zero) to a variable $N_g$ (step 604). For example, in the case of the codes shown in Table 2, N=2 because there are two features in each code with feature values other than zero (namely the "wide" features, which have a feature value of 1).

The method 600 decrements both N (step 606) and $N_g$ (step 608). A feature pointer f is initialized to point to the first feature in an array F of feature values representing the code being generated (step 610). If $N_g$ is greater than or equal to zero (step 611), the value $N!/N_g!/(N-N_g)!$ is assigned to a variable $C_s$ (step 612). Otherwise, $C_s$ is set to 0 (step 613).

If V (the value to be encoded) is greater than or equal to $C_s$ (step 614), then the feature value of feature f is set to zero (step 620), the value of V is decreased by $C_s$ (step 622), the value of N is decremented (step 624), and the feature pointer f is pointed at the next feature in the feature array F (step 626).

Returning to step 614, if the value V is not greater than $C_s$, then the feature value of feature f is set to one (step 630), the value of $N_g$ is decremented (step 632), the value of N is decremented (step 624), and the feature pointer f is pointed at the next feature in feature array F (step 626).

If N is not less than zero (step 628), then the method 600 returns to step 611 and continues to generate additional features in the code as described above. Otherwise, generation of the code is complete and the method returns the current feature array F as the code representing value V (step 634).

Figure 6B:
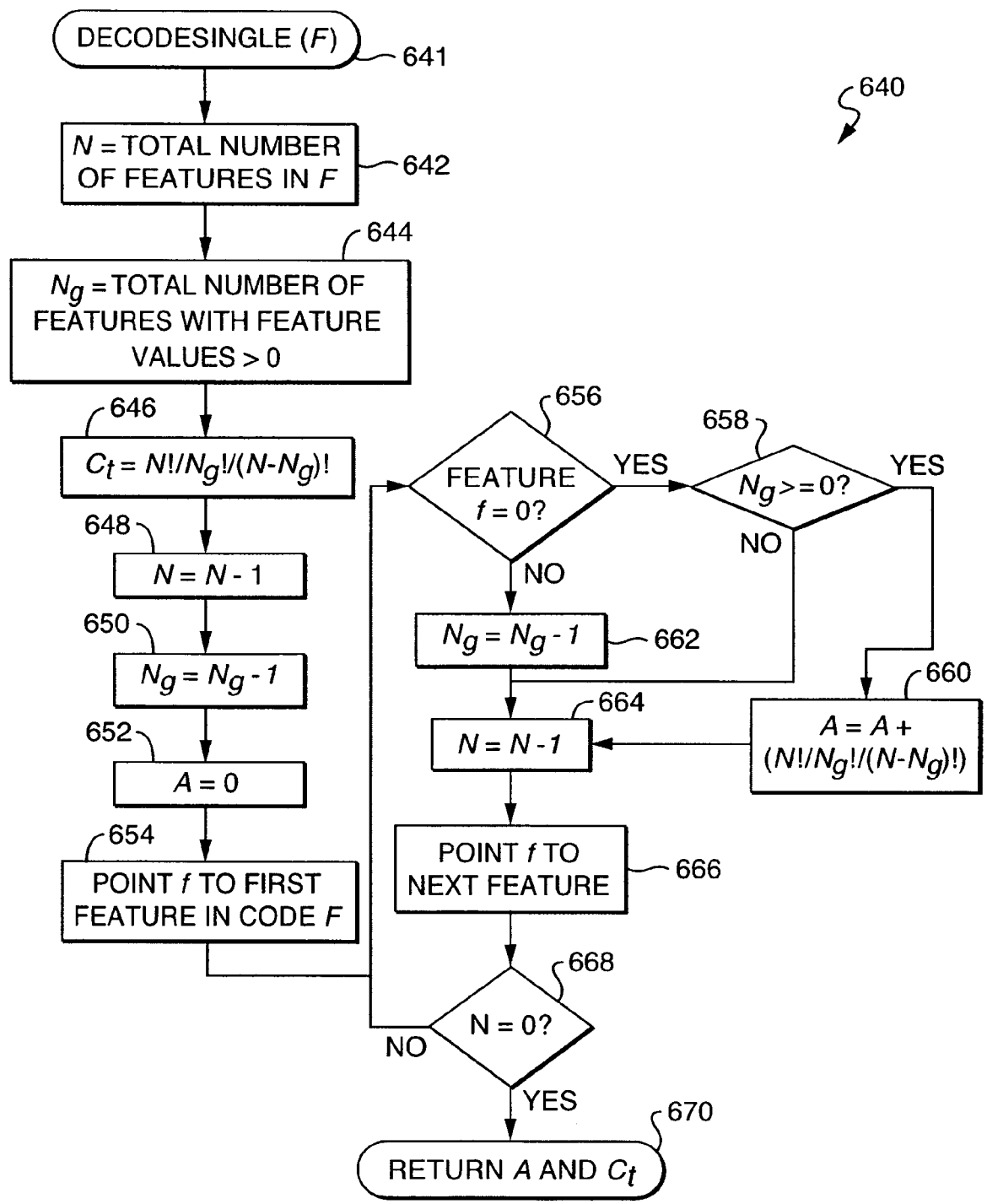
FIG. 6B is a flowchart of a method for decoding information from a code into a value represented by the code according to one embodiment of the present invention.

Referring to FIG. 6B, a flowchart is shown of a method 640 for decoding information from a feature array F (step 641) having the properties of the code shown in Table 2 (where n is replaced by 0 and w is replaced by 1) according to one embodiment of the present invention. Let N be the total number of features in the code (step 642). Let $N_g$ be the number of features in the code having feature values greater than 0 (step 644). The value of a variable $C_t$ is initialized to $N!/N_g!/(N-N_g)!$ (step 646). The values of N (step 648) and $N_g$ (step 650) are decremented. The value of the accumulator A is initialized to zero (step 652). A feature pointer f is initialized to point to the first feature in feature array F (step 654).

If the first feature f in feature array F has a feature value of 0 (step 656) and the value of $N_g$ is greater than or equal to zero (step 658), then $N!/N_g!/(N-N_g)!$ is added to the accumulator A (step 660). If the first feature f in feature array F does not have a feature value of 0, then $N_g$ is decremented (step 662). If the first feature f in feature array F has a feature value of 0 (step 656) and the value of $N_g$ is not greater than or equal to zero (step 658), then the method proceeds to step 664.

The value of N is decremented (step 664), and the feature pointer f is advanced to the next feature in the feature array F (step 666). If the value of N is not zero (step 668), then the method 640 returns to step 656. Otherwise, the values of the accumulator A and the variable $C_t$ are returned (step 670). The value of the accumulator A represents the decoded value of feature array F.

The encoding and decoding methods shown in FIGS. 6A-6B may be used to encode and decode codes with features having two distinct feature values (e.g., 0 and 1). As described above, however, embodiments of the present invention may be used to encode and decode codes having more than two distinct values. Examples of techniques for performing such encoding and decoding will now be described with respect to FIGS. 6C-6E.

Figure 6C:
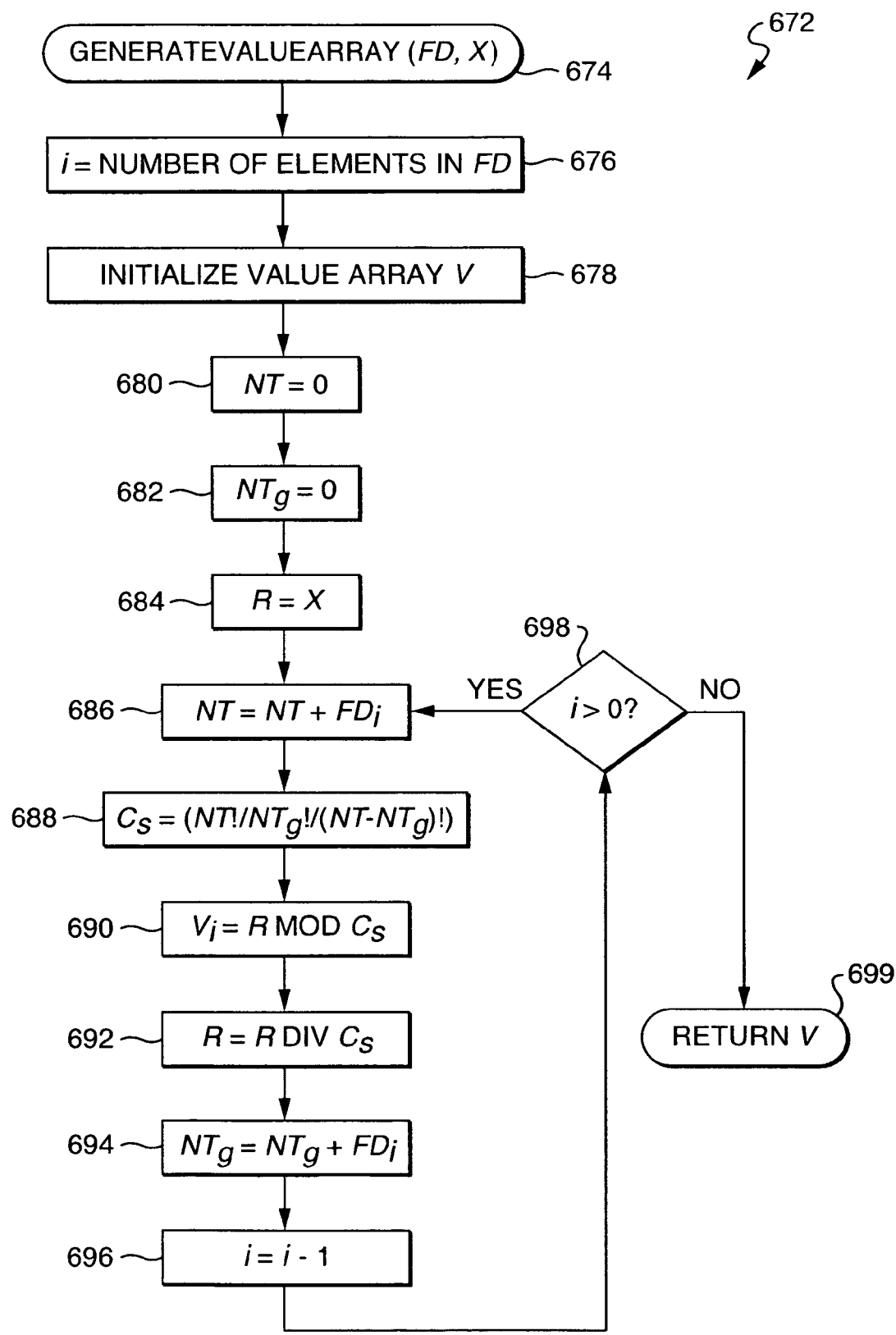
FIGS. 6C-6D are flowcharts of methods that are used to encode a value into a code according to one embodiment of the present invention.
Figure 6D:
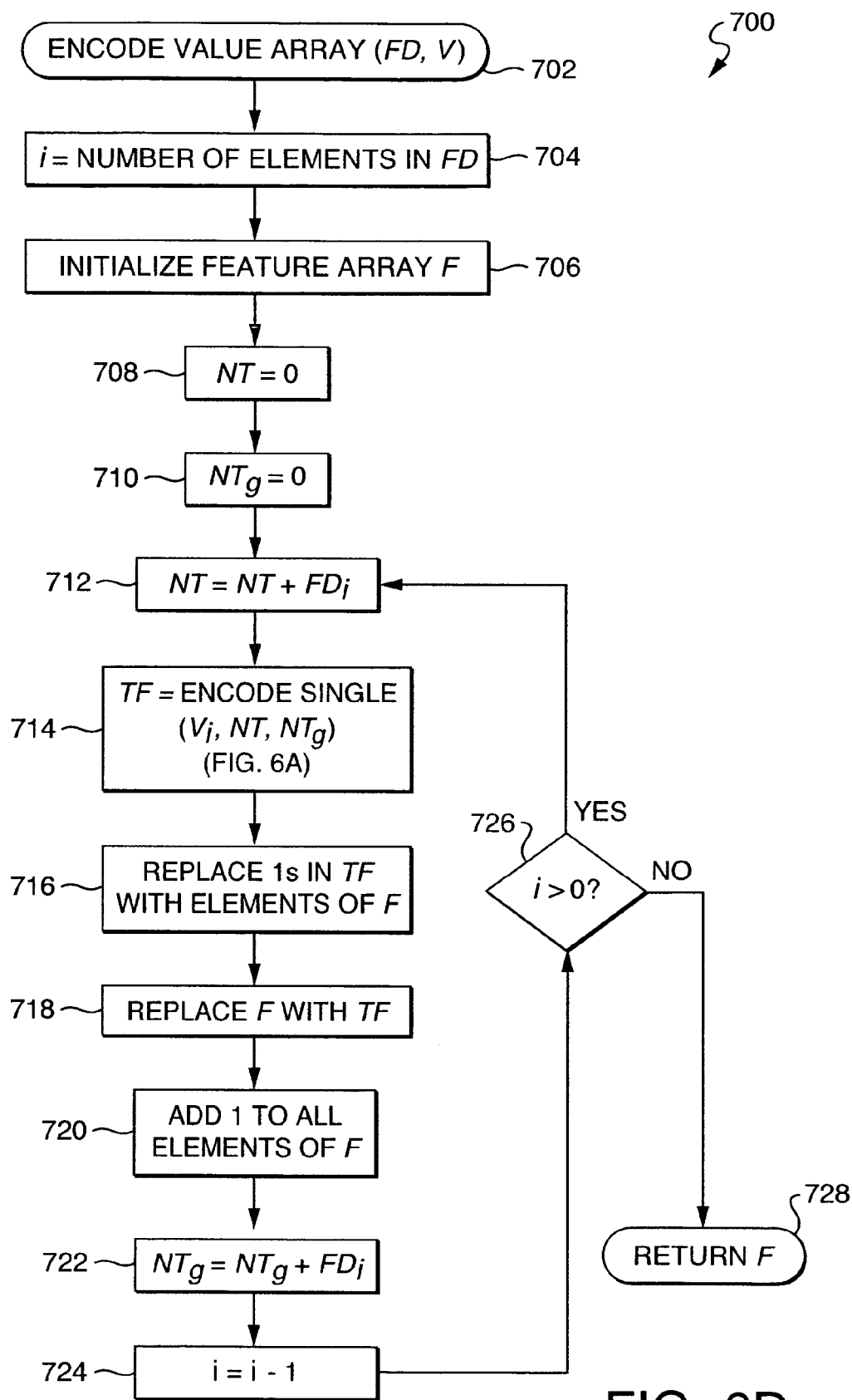

In particular, referring to FIGS. 6C-6D, two methods are illustrated which, in conjunction, are used to encode a value X. First, the method 672 illustrated in FIG. 6C encodes the value X into a "value array" V containing values $V_i$, for $0 < i \leq I_s$, where $I_s$ is the number of distinct feature values. The method 672 receives a feature distribution array FD and the value X to encode (step 674). As described above, a feature distribution array describes the number of features having each distinct feature value. For example, the feature distribution array [7,3,2,1] specifies that seven features have the first distinct feature value, three features have the second distinct feature value, two features have the third distinct feature value, and one feature has the fourth distinct feature value.

The method 672 initializes the value of i to the number of elements in FD (i.e., $i=I_s$) (step 676). The method 672 initializes the value array V by setting its size to $I_s$ (step 678). The method 672 initializes the value of NT to zero (step 680), initializes the value of $NT_g$ to zero (step 682), and initializes the value of R to X (step 684).

The method 672 increases the value of NT by the value of element i of the feature distribution array FD (step 686). The method 672 computes the value of $C_s$ as $(NT!/NT_g!/(NT-NT_g)!)$ (step 688). The method 672 calculates the value of the current element $V_i$ of the value array as R mod $C_s$ (step 690).

The method 672 divides R by C, using integer division and assigns the quotient to R (step 692). The method 672 increases the value of $NT_g$ by $FD_i$ (step 694) and decrements i (step 696).

If i>0 (step 698) the method 672 returns to step 686. Otherwise, creation of the value array V is complete and the method 672 returns the value array V (step 699).

Referring to FIG. 6D, a flowchart is shown of a method 700 that makes use of the value array V generated by the method 672 of FIG. 6C to encode the value X according to one embodiment of the present invention. The method 700 receives as input the same feature distribution array FD that was used in the method 672 of FIG. 6C and the value array V produced by that method 672.

The method 700 initializes i to the number of elements $I_s$ in the array FD (step 704). The method 700 initializes an empty feature array F having 0 elements (step 706) and initializes the values of NT (step 708) and $NT_g$ to zero (step 710). The method 700 increases the value of NT by $FD_i$ (step 712).

The method 700 uses the encoding method 600 shown in FIG. 6A to encode the value $V_i$ using a total of NT features, $NT_g$ of which have feature values greater than zero, into a temporary feature array TF now having NT elements (step 714). The method 700 replaces all ones in array TF with the elements of array F in a one-to-one correspondence, preserving the relative order in F (step 716). The method 700 then replaces feature array F with temporary feature array TF (step 718), adds one to all elements of F (step 720), increases the value of $NT_g$ by $FD_i$ (step 722), and decrements i (step 724).

If i>0 (step 726), the method 700 repeats steps 712-724. Otherwise, encoding of the value array V into feature array F is complete and the method 700 returns the feature array F (step 728).

Figure 6E:
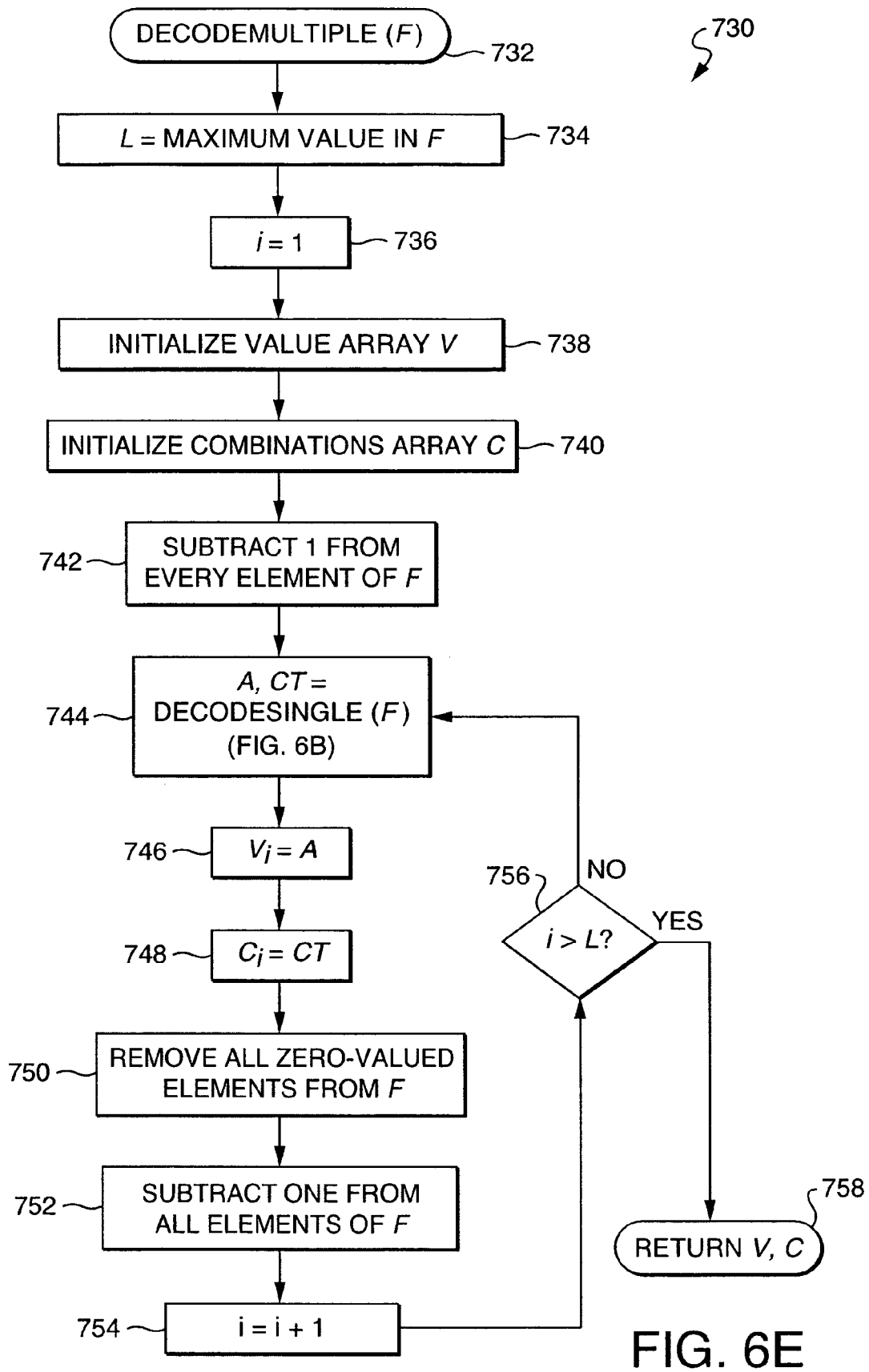
FIG. 6E is a flowchart of a method that is performed according to one embodiment of the present invention to decode a code into a value.

Referring to FIG. 6E, a flowchart is shown of a method 730 that is performed according to one embodiment of the present invention to decode a feature array F having two or more distinct feature values. The method 730 receives the feature array F (step 732) and assigns to a variable L the maximum value in array F (step 734). The method 730 initializes i to 1 (step 736), creates an empty value array V having L elements (step 738), and creates an empty combinations array C having L elements (step 740). The method 730 subtracts one from every element in the feature array F (step 742).

The method 730 uses the single-level decoding method 640 shown in FIG. 6B to decode the feature array F into a value A and the number of possible combinations CT at level i (step 744). The method 730 assigns the value A to the value array element $V_i$ (step 746) and assigns the value CT to the combinations array element $C_i$ (step 748).

The method 730 removes all zero-valued elements from the feature array F (step 750) and subtracts one from all remaining elements of F (step 752). The method 730 increments i (step 754).

If i≦L (step 756), the method 730 repeats steps 744-754. Otherwise, decoding of the feature array F into the value array V and combinations array C is complete and the method 730 returns the value array V and combinations array C (step 758). A final decoded value FV may, for example, be derived from the value array V and combinations array C using the methods 430 (FIG. 4B) or 450 (FIG. 4C) described above.

The above-referenced patent entitled "Thermal Imaging System" discloses a thermal printer in which the print head is capable of writing two colors in a single pass on a single print medium. The techniques disclosed in that patent may be applied to a wide variety of printers which may print on a wide variety of print media. Such media may vary, for example, in their size and sensitivity. To produce optimal printed output it is desirable to modify parameters of the printer based on such variable properties of the print media. Although the user of the printer may manually inform the printer of the properties of the print medium that is currently loaded in the printer, such a technique is both inconvenient for the user and prone to error.

Figure 7:
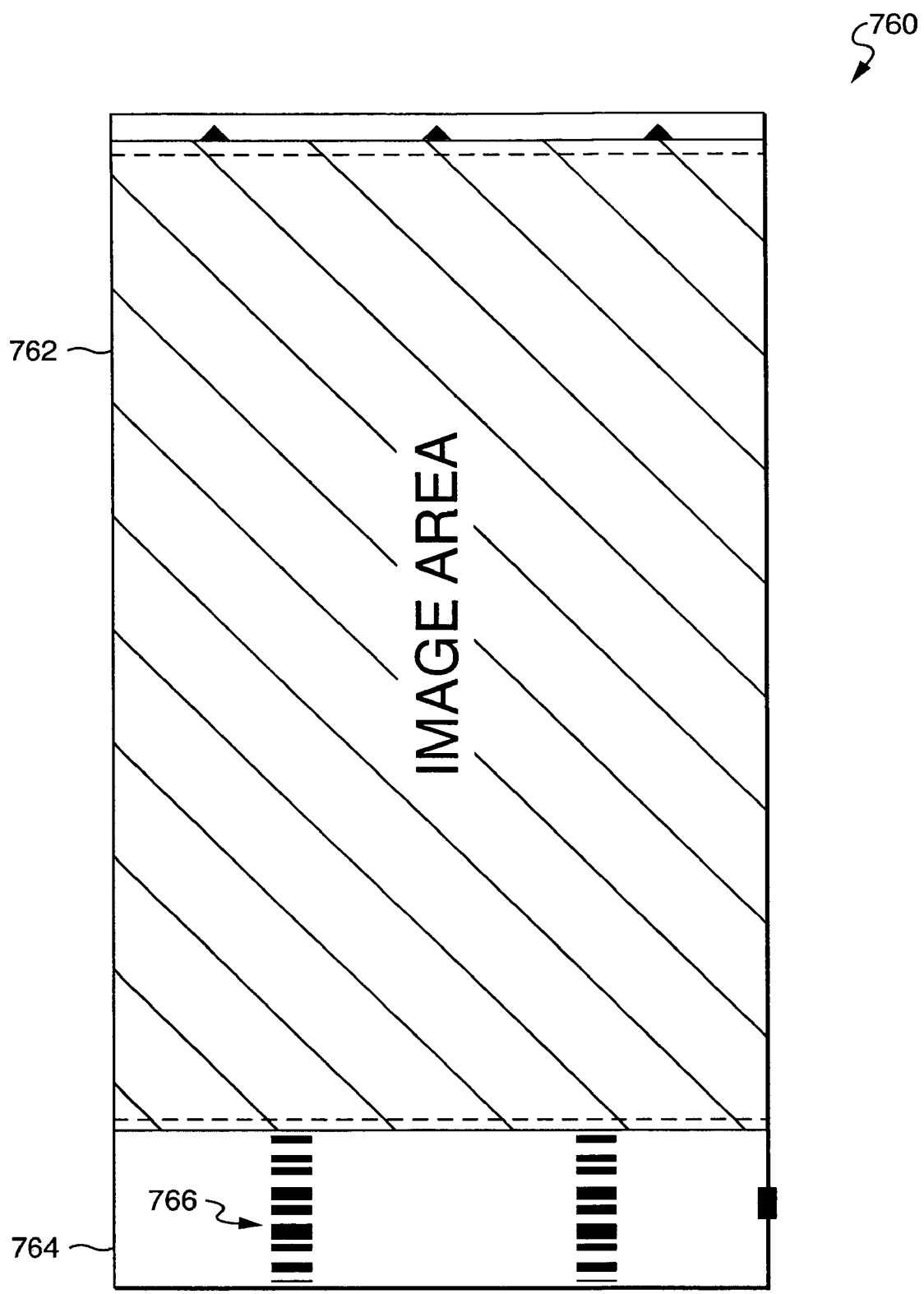
FIG. 7 is a diagram of a print medium including a bar code according to one embodiment of the present invention.

In one embodiment of the present invention, therefore, properties of a print medium are encoded on the print medium itself in the form of a bar code that is encoded according to any of the techniques disclosed herein. For example, referring to FIG. 7, a print medium 762 is shown that includes a bar code 766 printed on a tab 764, which may be removable from the print medium 762 (e.g., by using perforations). In one embodiment of the present invention, the "image area" of the print medium 762 (the portion of the print medium 762 not including the tab 764) is 4"×6", and the tab 764 is 4"×1.08". In one embodiment of the present invention, the bar code 766 is implemented as a bar code region including two distinct bar codes, one of which has a width distribution of (7,3,2,1) and the other of which has a width distribution of (7,3,2,1), (9,4,2,0), or (6,5,1,1), depending on the media size. The bar code 766 encodes print medium property information that is descriptive of properties of the print medium. As shown in FIG. 7, the bar code 766 may, for example, be printed in a predetermined region of the print medium, at a predetermined orientation, and at a predetermined size. As will be described in more detail below, constraining the printed properties of the bar code in this manner may facilitate the process of reading and interpreting the bar code.

Figure 8:
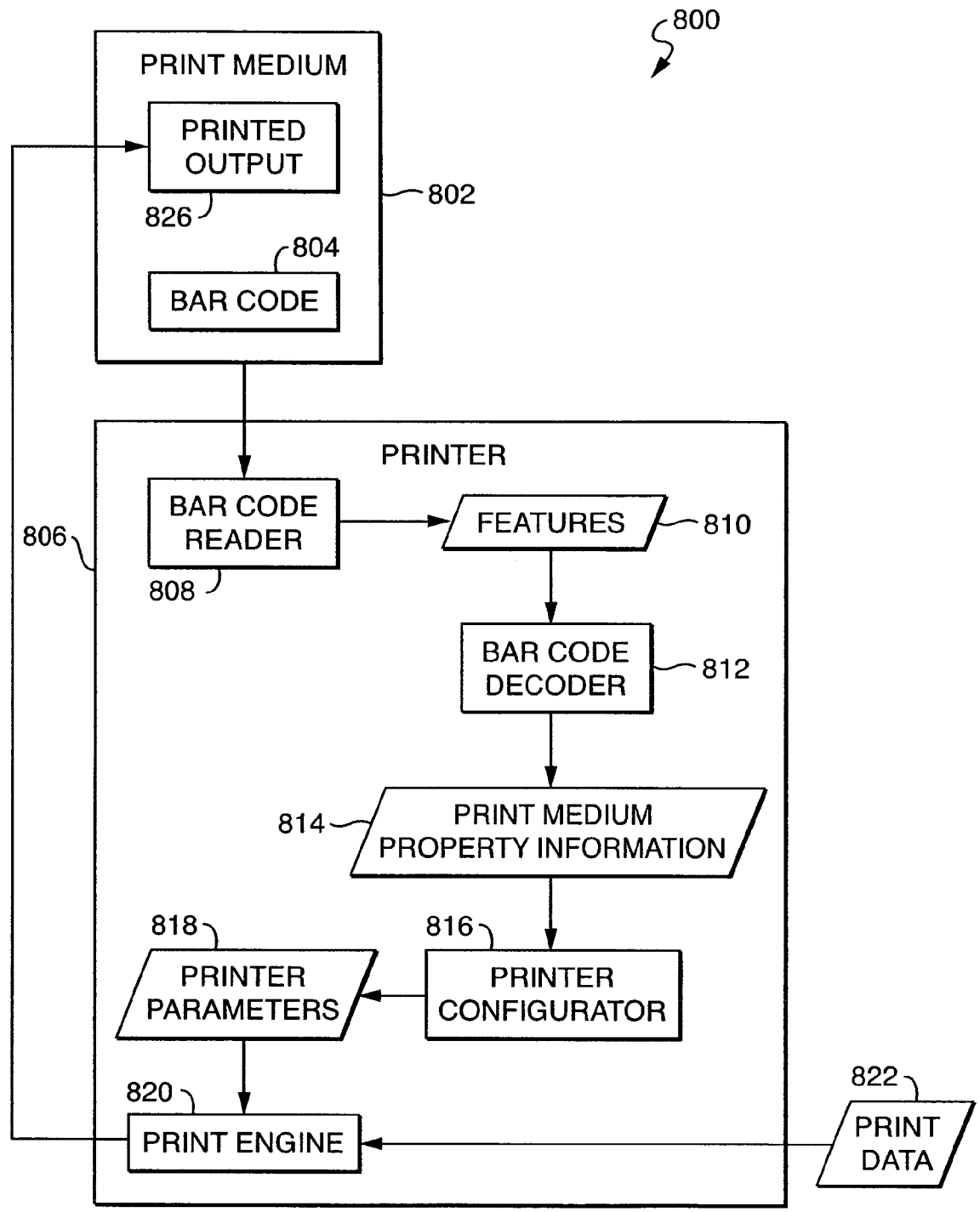
FIG. 8 is a dataflow diagram of a system in which a printer is configured based on a bar code printed on a print medium according to one embodiment of the present invention.
Figure 9:
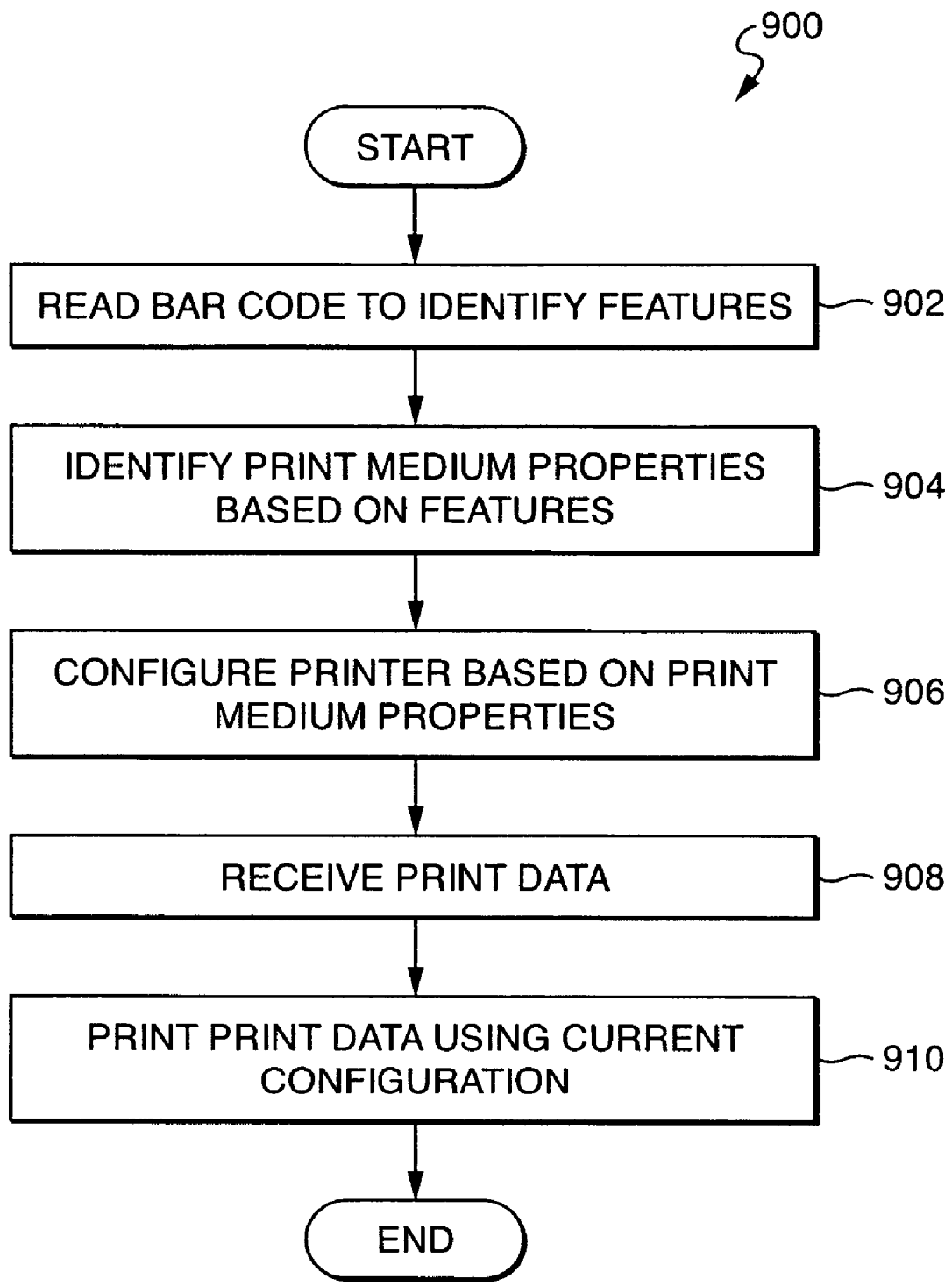
FIG. 9 is a flowchart of a method performed by the system of FIG. 8 according to one embodiment of the present invention.

Referring to FIG. 8, a dataflow diagram is shown of a system 800 in which a printer 806 is configured based on a bar code 804 printed on a print medium 802. The printer 806 produces printed output 826 on the print medium 802 based on the configuration derived from the bar code 804. Referring to FIG. 9, a flow chart is shown of a method 900 that is performed by the system 800 according to one embodiment of the present invention.

Note that properties of the print medium 802 may be identified and encoded into the bar code 804 using any of the techniques disclosed herein. The bar code 804 may be printed on the print medium 802 at any point prior to performance of the method 900, such as during the manufacturing finishing operation. The bar code 804 may be placed on the medium 802 in any of various ways. If, for example, the medium 802 is thermally-sensitive, the bar code 804 may be printed thermally. Alternatively, any of a number of conventional printing technologies, including pad and ink jet printing, may place the bar code 804 on the medium 802.

The printer 806 includes a bar code reader 808. Note that components, such as the bar code reader 808, which are illustrated as components of the printer 806 in FIG. 8, may alternatively be implemented as components external to the printer 806 and communicate with the printer 806 using any appropriate communications means. The bar code reader 808 reads the bar code 808 and thereby identifies the features 810 in the bar code 804 (step 902).

The bar code reader 808 may be any kind of device capable of reading the bar code 804. For example, the printer 806 may already include a conventional LED/photodiode pair to sense the presence of a sheet of media. This LED/photodiode pair may also be used as the bar code reader 808 to read the bar code using visible light. Therefore, it should be appreciated that the bar code reader 808 need not be a special-purpose bar code reading device. If, as in FIG. 7, the bar code 766 is printed on tab 764, which may be removed by the user, ordinary dyes may be used to print the bar code 766, and neither infrared dyes nor fluorescent compounds are required.

The printer 806 includes a bar code decoder 812 that decodes some or all of the features 810 into print medium property information 814 which is descriptive of properties of the print medium 802 (step 904). Note that the print medium property information 814 encoded in the bar code 804 need not specify all properties of the print medium 802. Furthermore, the print medium property information 814 may specify partial information about particular properties. The print medium property information 814 may point to printer parameters 818 stored in the printer 806. The parameters 818 may contain detailed configuration information not contained in the bar code 804 itself.

The printer 806 includes a printer configurator 816, which may be implemented as an embedded microprocessor that modifies parameters 818 of the printer 806 based on the print medium property information 814 (step 906). For example, the printer 806 may alter how it prints any given color by changing the amount of energy delivered to the print head in accordance with the specific properties of the print medium based on the information in the bar code. If the print medium has higher sensitivity than normal, the printer will, overall, use less energy to print. For media of higher or lower sensitivity, then, the bar code may contain print medium property information indicative of the higher or lower sensitivity, and the printer configurator 816 may use this information to cause the printer to decrease or increase the range of energies used in printing. If the characteristic response curve of the print medium (printed density as a function of energy) changes, the bar code may contain print medium property information identifying a characteristic curve that closely matches that of the media, and the printer configurator 816 may use the information to select this curve as its reference for determining the correct printing energy for each density.

The printer 806 includes a print engine 820 that receives print data 822 representing a print job (step 908). The print engine 820 generates printed output 826 on the print medium 802 based on the print data 822 and the printer parameters 818 (step 910). In other words, the print engine 820 prints the print data 822 using the printer 806 as configured in step 906 based on the print medium property information encoded in the bar code 804. The system 800 thereby uses the bar code 804 to optimize the printed output 826 based on the properties of the print medium 802.

Among the advantages of the invention are one or more of the following. As disclosed herein, various embodiments of the present invention encode information in bar codes which are not subdivided into multiple symbols. Rather, such bar codes include a single sequence of undivided features, thereby increasing the information densities in comparison to conventional bar codes. Such increased information densities enable more information to be encoded in the same space as conventional bar codes. High information densities are particularly important when space is at a premium and/or when the bar code reader 808 has a low resolution. For example, in one embodiment in which the bar code reader 808 is an LED/photodiode pair, the reader 808 may only be capable of sensing features that are 1 mm or wider. If, for example, the space (e.g., tab 764) in which the bar code 804 must be printed is 25 mm long, there is only room for 11 to 15 features in the bar code. In such a case, it is particularly advantageous to provide bar codes with high information densities. In one embodiment, the space available for bar code 804 is 23 mm long with a sensor capable of sensing features 1 mm or wider. Using a 2-of-5 type bar code with multiple symbols and start and stop codes, the range of numbers that could be encoded is 0 through 99, for a total of 100 numbers. Embodiments of the present invention may encode up to 102,960 numbers within that space, or over 1000 times that of the 2-of-5 bar code.

Another advantage of embodiments of the present invention is that bar code symbols of unlimited length may be generated, thereby encoding information with a higher information density than bar codes having limited-length symbols. Similarly, the decoding techniques disclosed herein may be used to decode bar code symbols of unlimited length, except as may be limited by the computational capabilities of the decoding system.

As noted above, bar codes used in various embodiments of the present invention need not include start codes and stop codes. One reason for the use of start and stop codes in conventional bar code systems is that the size, orientation, format, and location of the input bar code may vary. In the embodiment illustrated in FIG. 7, however, the size, orientation, format, and location of the bar code 766 is fixed and known in advance. As a result of such a controlled environment, the printer 806 may be configured to read the bar code 766 accurately based on this predetermined knowledge of the properties of the bar code 766 without the use of start and stop codes.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Examples of print medium property information that may be encoded according to embodiments of the present invention include, but are not limited to: the minimum and maximum densities of the print medium colorants or dyes; codes indicating which tone curves to use when printing; parameters used to construct or modify tone curves according to print medium properties; overall sensitivity of the print medium; color balance of the medium; temperature sensitivity of the print medium; size of the print medium; types of colorants present in the print medium; codes indicating how to reconfigure the printer to update its function or parameters relating to print media; or any other information related to the configuration of the printer and how it handles and prints on the current print medium.

Although particular examples disclosed herein refer to bar codes, embodiments of the present invention are not limited to use in conjunction with bar codes. Rather, embodiments of the present invention may be used in conjunction with any kind of code for encoding print medium information on an output medium. For example, although particular examples disclosed herein refer to "bars" and "spaces" in bar codes, such terms are merely examples of "features" in a coding system. For example, distinct colors are examples of features that may be used to encode information. Those having ordinary skill in the art will appreciate, therefore, how to implement the techniques disclosed herein using features other than bars and spaces. Similarly, although certain examples disclosed herein refer to "wide" and "narrow" features, these are merely examples of properties of features in a coding system. Those having ordinary skill in the art will appreciate, therefore, that techniques that are applied to "wide" and "narrow" features may alternatively be applied to any two features which differ from each other in any way. The same is true more generally for terms such as "width," which may alternatively refer more generally to any property whose value may vary among features in a code.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming, language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive, programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Printers suitable for use with various embodiments of the present invention typically include a print engine and a printer controller. The printer controller receives print data from a host computer or directly accesses the image data in a memory device either through direct connection (e.g., using wires or optical cables) or wireless transmission, and generates page information. The printer controller transmits the page information to the print engine to be printed. The print engine performs the physical printing of the image specified by the page information on an output medium.

What is claimed is:

1. A method for writing an encoding symbol on an output medium, wherein the encoding symbol comprises a set of encoding features comprising a predetermined number of first bars and a predetermined number of second bars, wherein each of the first bars is wider than each of the second bars, and the first and second bars are configured to be ordered to encode ones of a plurality of input values, the method comprising:
    transforming a value from the plurality of input values into an encoding symbol comprising the set of encoding features; and
    writing the encoding symbol on an output medium with the predetermined number of first bars and the predetermined number of second bars in an order which encodes the value, wherein the encoding symbol lacks a start code and a stop code.

2. The method of claim 1, wherein the encoding symbol consists of the set of ordered encoding features.

3. The method of claim 1, wherein the writing comprises writing the encoding symbol on the output medium without writing a start code or a stop code on the output medium.

4. The method of claim 1, wherein the writing comprises writing the encoding symbol on a first portion of the output medium that is removable from a second portion of the output medium.

5. A system for writing an encoding symbol on an output medium, wherein the encoding symbol comprises a set of encoding features comprising a predetermined number of first bars and a predetermined number of second bars, wherein each of the first bars is wider than each of the second bars, and the first and second bars are configured to be ordered to encode ones of a plurality of potential input values, the system comprising:
    means for transforming a value from the plurality of input values into an encoding symbol comprising the set of encoding features; and
    means for writing the encoding symbol on an output medium with the predetermined number of first bars and the predetermined number of second bars in an order which encodes the value, wherein the encoding symbol lacks a start code and a stop code.

6. The system of claim 5, wherein the encoding symbol consists of the set of ordered encoding features.

7. A method for decoding an encoded value represented by an encoding symbol, wherein the encoding symbol comprises a set of encoding features comprising a predetermined number of first bars and a predetermined number of second bars, wherein each of the first bars is wider than each of the second bars, and the first and second bars are configured to be ordered to encode ones of a plurality of potential input values, the method comprising:
    identifying the encoding symbol from on an output medium, wherein the encoding symbol comprises the set of encoding features, and wherein the encoding symbol lacks a start code and a stop code;
    determining the order of the predetermined number of first bars and the predetermined number of second bars in the encoding symbol; and
    deriving the encoded value based on the order of the predetermined number of first bars and the predetermined number of second bars.

8. The method of claim 7, wherein the encoding symbol consists of the set of encoding features.

9. The method of claim 7, wherein the identifying the encoding symbol comprises identifying the encoding symbol from the output medium without reading any start code or stop code.

10. The method of claim 7, wherein the identifying the encoding symbol comprises identifying the encoding symbol from a region of predetermined size on the output medium.

11. The method of claim 7, wherein the decoded value represents at least one property of the output medium, and wherein the method further comprises:
    configuring a printer based on the at least one property of the output medium.

12. The method of claim 11, further comprising:
    printing output on the output medium after configuring the printer.

13. A system for decoding an encoded value represented by an encoding symbol, wherein the encoding symbol comprises a set of encoding features comprising a predetermined number of first bars and a predetermined number of second bars, wherein each of the first bars is wider than each of the second bars, and the first and second bars are configured to be ordered to encode ones of a plurality of potential input values, the system comprising:
    means for identifying the encoding symbol from on an output medium, wherein the encoding symbol comprises the set of encoding features, and wherein the encoding symbol lacks a start code and a stop code;
    means for determining the order of the predetermined number of first bars and the predetermined number of second bars in the encoding symbol; and
    means for deriving the encoded value based on the order of the predetermined number of first bars and the predetermined number of second bars.

14. The system of claim 13, wherein the encoding symbol does not comprise a start code or a stop code.

15. A method for enabling encoding or decoding of a plurality of input values to or from encoding symbols which can be read with a bar code reader, the method comprising:
    determining a plurality of input values;
    identifying a set of encoding features comprising a predetermined number of first bars and a predetermined number of second bars, wherein each of the first bars is wider than each of the second bars, and the first and second bars are configured to be ordered to encode each of the plurality of input values, wherein an encoding symbol corresponding to each input value comprises the set of encoding features in the order corresponding to each input value;
    determining a set of encoding rules for transforming input values into encoding symbols and encoded symbols into input values; and
    making the set of encoding rules available to the user for storage by the user in a computer readable medium, whereby the user can follow the rules to encode input values into encoding symbols or decode encoding symbols into input values.

16. A system for writing an encoding symbol on an output medium, wherein the encoding symbol comprises a set of encoding features comprising a predetermined number of first bars and a predetermined number of second bars, wherein each of the first bars is wider than each of the second bars, and the first and second bars are configured to be ordered to encode ones of a plurality of potential input values, the system comprising:
- a processor configured to transform a value from the plurality of input values into an encoding symbol comprising the set of encoding features; and
- a writing mechanism configured to write the encoding symbol on an output medium with the predetermined number of first bars and the predetermined number of second bars in an order which encodes the value, wherein the encoding symbol lacks a start code and a stop code.

17. The system of claim 16, wherein the encoding symbol consists of the set of ordered encoding features.

18. A system for decoding an encoded value represented by an encoding symbol, wherein the encoding symbol comprises a set of encoding features comprising a predetermined number of first bars and a predetermined number of second bars, wherein each of the first bars is wider than each of the second bars, and the first and second bars are configured to be ordered to encode ones of a plurality of potential input values, the system comprising:
- a scanning mechanism configured to identify the encoding symbol from on an output medium, wherein the encoding symbol comprises the set of encoding features, and wherein the encoding symbol lacks a start code and a stop code; and
- a processor configured to:
  - determine the order of the predetermined number of first bars and the predetermined number of second bars in the encoding symbol, and
  - derive the encoded value based on the order of the predetermined number of first bars and the predetermined number of second bars.

19. The system of claim 18, wherein the encoding symbol does not comprise a start code or a stop code.

* * * * *

UNITED STATES PATENT AND TRADEMARK OFFICE
CERTIFICATE OF CORRECTION

| | |
|---|---|
| PATENT NO. | : 7,905,409 B2 |
| APPLICATION NO. | : 11/133920 |
| DATED | : March 15, 2011 |
| INVENTOR(S) | : Bybell et al. |

It is certified that error appears in the above-identified patent and that said Letters Patent is hereby corrected as shown below:

Title page, item (75), under "Inventors", in Column 1, Line 2, delete "Willilam" and insert -- William --.

Title Page 2, item (56), under "Other Publications", in Column 2, Line 7, delete "pp. 389-39." and insert -- p. 389. --.

Signed and Sealed this
Nineteenth Day of July, 2011

David J. Kappos
*Director of the United States Patent and Trademark Office*